United States Patent
Sen et al.

(10) Patent No.: US 9,620,959 B2
(45) Date of Patent: Apr. 11, 2017

(54) ENHANCED GRID RELIABILITY THROUGH PREDICTIVE ANALYSIS AND DYNAMIC ACTION FOR STABLE POWER DISTRIBUTION

(71) Applicant: Accenture Global Services Limited, Dublin (IE)

(72) Inventors: Prabir Sen, Glenview, IL (US); Trent A. Mayberry, Brighton (AU)

(73) Assignee: Accenture Global Services Limited, Dublin (IE)

( * ) Notice: Subject to any disclaimer, the term of this patent is extended or adjusted under 35 U.S.C. 154(b) by 782 days.

(21) Appl. No.: 13/834,388

(22) Filed: Mar. 15, 2013

(65) Prior Publication Data

US 2014/0281645 A1    Sep. 18, 2014

(51) Int. Cl.
*H02J 3/32* (2006.01)
*H02J 3/14* (2006.01)
(Continued)

(52) U.S. Cl.
CPC ............... *H02J 3/32* (2013.01); *G06Q 50/06* (2013.01); *H02J 3/24* (2013.01); *H02J 3/28* (2013.01);
(Continued)

(58) Field of Classification Search
CPC   G01D 4/00; G06F 1/3203; G06F 1/28; G06F 1/3206; H02J 2003/143; H02J 3/14;
(Continued)

(56) References Cited

U.S. PATENT DOCUMENTS

| 5,483,656 A  *  |  1/1996  |  Oprescu et al. ............... 713/320 |
| 7,062,361 B1 * |  6/2006  |  Lane ............................. 700/295 |

(Continued)

FOREIGN PATENT DOCUMENTS

| WO | WO 2012/008979 A2 | 1/2012 |
| WO | WO 2012/095870 A2 | 7/2012 |

OTHER PUBLICATIONS

Australian Patent Examination Report No. 1, dated May 14, 2014, pp. 1-4, issued in Australian Patent Application No. 2014201562, IP Australia, Woden ACT, Australia.

(Continued)

*Primary Examiner* — Jaweed A Abbaszadeh
*Assistant Examiner* — Terrell Johnson
(74) *Attorney, Agent, or Firm* — Brinks Gilson & Lione

(57) ABSTRACT

A power grid stabilizing system may include a processor and a network interface executable by the processor to monitor for new event data from power consumption devices over a network. The new event data may include information such as device location, operating information, and sensor data. The system may include an estimation engine operable to analyze the new event data to determine power consumption behavior of a consumption device, and a predictor operable to anticipate an occurrence of a future event responsive to the analysis. The predictor may also predict the outcome of the future event based on analysis of the new event data in relation to past behavior data of the consumption device. The network interface may further communicate the anticipated future event and the predicted outcome to one or more of the other consumption devices.

25 Claims, 20 Drawing Sheets

(51) Int. Cl.
*H02J 3/00* (2006.01)
*H02J 3/24* (2006.01)
*H02J 13/00* (2006.01)
*H02J 3/28* (2006.01)
*G06F 1/32* (2006.01)
*G06Q 50/06* (2012.01)

(52) U.S. Cl.
CPC ......... *G06F 1/3203* (2013.01); *H02J 13/0062* (2013.01); *H02J 13/0075* (2013.01); *H02J 2003/003* (2013.01); *H02J 2003/143* (2013.01); *Y02E 60/722* (2013.01); *Y04S 10/14* (2013.01); *Y04S 10/54* (2013.01)

(58) Field of Classification Search
CPC ..... H02J 9/005; G06Q 50/06; Y02B 70/3266; Y04S 20/242
See application file for complete search history.

(56) References Cited

U.S. PATENT DOCUMENTS

| | | | |
|---|---|---|---|
| 7,233,843 B2 | 6/2007 | Budhraja et al. | |
| 2009/0281673 A1 | 11/2009 | Taft | |
| 2010/0025483 A1 | 2/2010 | Hoeynck et al. | |
| 2010/0082176 A1* | 4/2010 | Chang | H02J 3/14 700/295 |
| 2010/0138363 A1* | 6/2010 | Batterberry | G06Q 10/04 705/412 |
| 2010/0324962 A1* | 12/2010 | Nesler | G05B 15/02 705/7.36 |
| 2010/0332373 A1* | 12/2010 | Crabtree | G06Q 50/06 705/37 |
| 2011/0098869 A1 | 4/2011 | Seo et al. | |
| 2011/0172836 A1* | 7/2011 | Boss | G01D 4/00 700/291 |
| 2011/0235561 A1* | 9/2011 | Liu | H04L 41/30 370/311 |
| 2011/0264291 A1 | 10/2011 | Le Roux et al. | |
| 2011/0282505 A1 | 11/2011 | Tomita et al. | |
| 2012/0089269 A1 | 4/2012 | Weaver et al. | |
| 2012/0223840 A1 | 9/2012 | Guymon et al. | |
| 2012/0239595 A1 | 9/2012 | Kiuchi et al. | |
| 2012/0271470 A1 | 10/2012 | Flynn et al. | |
| 2012/0310423 A1 | 12/2012 | Taft | |
| 2012/0316691 A1 | 12/2012 | Boardman et al. | |

OTHER PUBLICATIONS

Australian Patent Examination Report No. 2, dated Sep. 23, 2014, pp. 1-2, issued in Australian Patent Application No. 2014201562, IP Australia, Woden ACT, Australia.

Singapore Search Report and Written Opinion, dated Mar. 3, 2015, pp. 1-12, issued in Singapore Application No. 2013019245, Intellectual Property Office of Singapore, Singapore.

Amin, M., and Stringer, J., "The Electric Power Grid: Today and Tomorrow," *MRS Bulletin* 33(4):399-407 (2008).

Department of Energy, "Demand Response," http://energy.gov/oe/technology-development/smart-grid/demand-response, 2 pages (Oct. 2012).

Gharavi, H., and Ghafurian, R., "Smart Grid: The Electric Energy System of the Future," *Proceedings of the IEEE*, 99(6):917-921 (2011).

Motamedi, A., Zareipour, H., & Rosehart, W., "Electricity Price and Demand Forecasting in Smart Grids," *IEEE Transactions on Smart Grid*, 3(2):664-674 (2012).

Wang, J., Kennedy, S., and Kirtley, J., "A New Wholesale Bidding Mechanism for Enhanced Demand Response in Smart Grids," In *Innovative Smart Grid Technologies (ISGT)*, *2010*, pp. 1-8 (2010).

\* cited by examiner

Fig 13

| No | Est. Bill | main power | bldg. power | self power | grid | green | Save ($) | |
|---|---|---|---|---|---|---|---|---|
| 1 | $98.00 | 55% | 35% | 10% | 48% | 51% | 48% | Accept |
| 2 | $98.50 | 54% | 36% | 10% | 48% | 51% | 51% | Accept |
| 3 | $99.00 | 54% | 36% | 12% | 47% | 52% | 51% | Accept |
| 4 | $99.50 | 54% | 37% | 9% | 47% | 52% | 52% | Accept |
| 5 | $100.00 | 53% | 37% | 10% | 47% | 53% | 52% | Accept |
| 6 | $101.00 | 52% | 38% | 10% | 45% | 53% | 53% | Accept |
| 7 | $101.50 | 54% | 38% | 8% | 45% | 54% | 54% | Accept |
| 8 | $102.50 | 55% | 45% | - | 40% | 55% | 56% | Accept |
| 8 | 103.50 | 52% | 48% | - | 41% | 54% | 56% | Accept |

1400

ENHANCED GRID RELIABILITY THROUGH PREDICTIVE ANALYSIS AND DYNAMIC ACTION FOR STABLE POWER DISTRIBUTION

BACKGROUND

1. Field of the Disclosure

The present disclosure relates generally to a system and method for improving reliability of a power grid, and more particularly, to the predictive analysis of aggregated demand and supply of power, and to the dynamic reallocation of supply to meet predictions in demand in prevention of fault conditions.

2. Related Art

Power grids are extensive and may be geographically diverse in being spread over large areas. In some regions, large distances between communities, especially in rural areas, may separate sections of a power grid. Still, the communities may rely on the same main grid for power, where the main grid is fueled by traditional power sources such as coal, other natural fuels, water and nuclear Increasingly, renewable or "green" energy sources such as solar and wind may be used to augment the main power gird. These power sources may provide an auxiliary source of power to local households, buildings and communities. Renewable energy sources may also be connected to the main power grid to provide power generation as an additional supply of power that may become available to other users on the grid, such as users in neighboring homes, units or communities.

The increase numbers of renewable energy sources connected to the grid, however, presents new challenges because these renewable energy sources inject variability and unpredictability into the power grid as a whole. For example, it may be difficult to reliably predict how much the sun will shine or the wind will blow during a period of time. Combined with the fact that power grids are also becoming increasingly more distributed and far-reaching, results in a complex network environment that is difficult to control with stability from week to week, day to day or even from minute to minute. This is particularly the case in geographic areas that are growing rapidly without a commensurate growth in available power.

BRIEF SUMMARY

The present disclosure generally relates to a method and a system for monitoring for and analyzing grid event data from power consumption and power generation devices in a power grid, anticipate events based on the analysis, and predict an outcome of the future event based on new events and past behavior of the power consumption and power generation devices. New event data or new events may be aggregated at a household or unit level, up to and including at community and regional levels. Analysis of the aggregated new events may lead to anticipation of a higher-level new event in the grid, which may include brownout or blackout conditions or other fault in the power grid.

Application of certain algorithms on the aggregated data may further lead to a prediction of an outcome of the new event at a hierarchical level of the power grid. Based on any prediction from the above predictions, the system may send a demand response command to one or more consumption or generations devices in an attempt to resolve the potential fault. In response to the demand response command, these devices may adjust the amount of power consumed or generated, or may shut down or turn on. The command may be sent to individual devices or may be sent to groups of devices at household or community level. Priorities may be considered in deciding to which devices to send a demand response command.

Further analysis may be performed in the case of an identified device or groups of devices that has deficient power or energy. Additional analysis may identify closest power source(s) in the grid that may have excess power and actions may be taken to redistribute the excess power to the deficient devices or group of devices. In so doing, the system may analyze the paths of the grid that may extend between the excess power sources and the devices that need the excess power. Part of the analysis may recommend action and/or take actions to skirt around or go through obstacles in the power grid so that the excess power may be successfully transferred to the devices that have deficient power sources.

In one example, a processor-implemented method for enhancing the stability of the power grid may include orchestrating peer-to-peer communication between power consumption devices over a communication network, each of the power consumption devices being associated with an access device operable to provide communication with other of the consumption devices. The method may further monitor for new event data from the consumption devices. The new event data may include information regarding the device location, operating information of the devices, and/or sensor data from the devices. The method may further analyze the new event data to determine power consumption behavior of the consumption devices. The method may further anticipate an occurrence of a future event responsive to the analysis in relation to at least one of the consumption devices. The method may further predict the outcome of the future event based on analysis of the received new event data in relation to past behavior data of the consumption device, and communicate the anticipated future event and the predicted outcome to one or more of the other consumption devices.

A system for enhancing reliability of a power grid may include, among other structures, a processor and a network interface executable by the processor to monitor for new event data from power consumption devices over a network. The new event data may include information regarding device location, operating information of devices, and sensor data from the devices. The system may further include an estimation engine executable by the processor to analyze the new event data to determine power consumption behavior of a consumption device. The system may further include a predictor executable by the processor to anticipate an occurrence of a future event responsive to the analysis, and to predict the outcome of the future event based on analysis of the new event data in relation to past behavior data of the consumption device. The network interface may further communicate the anticipated future event and the predicted outcome to one or more of the other consumption devices.

Another processor-implemented method of enhancing reliability of the power grid may include determining power demand from buildings that include power consumption devices connected into the power grid. The method may further determine an amount of power supply available from power sources that feed the buildings. The method may further calculate a power demand-supply gap at each of at least some of the buildings. The method may further forecast times when and identifying building locations where the power demand-supply gap will increase and when and where the power demand-supply gap will decrease.

The method may further determine one or more paths between a first building where power is forecasted to be needed and power sources that have excess power. The method may further determine a speed at which the power demand-supply gap is increasing at the first building, and identify, a nearest power source located along the one or more paths, the nearest power source having excess power supply and being able to close the demand-supply power gap before the first building reaches a blackout condition. Accordingly, the timing of the ability to deliver the excess power may be considered at various potential nearest power sources that have excess power to offload. The method may further include sending a command to the nearest power source to transfer some of the excess power to the first building, to alleviate a threat of the blackout condition at the first building.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

FIG. 13 is a screen shot of an example application executable by an access device such as shown in FIG. 1.

DETAILED DESCRIPTION

By way of overview, the example embodiments described below relate to a system and methods for reliable and stable distribution of power, using renewable energy generated by ordinary households, communities and/or operators other than power companies. Orchestrating information and power flow for such stability may use systemic forecasting, simulating and optimizing power flow control methods, design and processing techniques embedded in devices located in a distributed complex grid network environment, with or without aggregated centralized control. The orchestrating may use atomic-level data collaboration to determine causes of location-based demand surge, and to optimize search-and-feed of power to loads and management of capacity and reserve power sources, such as renewable energy generation sources. Furthermore, dynamic optimal power flow control may manage uncertainty in real time with real-time data at all levels, e.g., from device to units or households to communities, and the like.

According to an embodiment, a power flow prediction and actuation system may be operable to estimate a location-based device-specific state based on location-based conditions, activities and usage through use of multiple sources of distributed data. The system may be further operate to apply advancing analyses techniques in real-time to adaptively influence power flow decisions at device, household and societal levels. Entities may respond to actuation and targeting mechanisms with dynamic distributed data at a location and at a moment in time through collaboration that is relevant to individual devices.

Analytical prediction for each device may be aggregated to form a collection of dynamic, predictive decisions relevant to a household, and the collection of such decisions may be used to anticipate events at a societal level, and to predict the outcome of those events. The system may then load balance across at least portions of the power grid to reduce the likelihood that anticipated increases in demand might result in brownouts of blackouts. A brownout is a period of reduced power supply or quality of the supply.

For simplicity and illustrative purposes, the principles of the disclosed embodiments are described by referring to examples thereof. In the following description, numerous specific details are set forth in order to provide a thorough understanding of the embodiments. The embodiments, however, may be practiced without limitation to these specific details. In some instances, well known methods and structures have not been described in detail so as not to unnecessarily obscure the description of the embodiments. Furthermore, different embodiments are described below, and may be used or performed together in different combinations.

Figure 1:
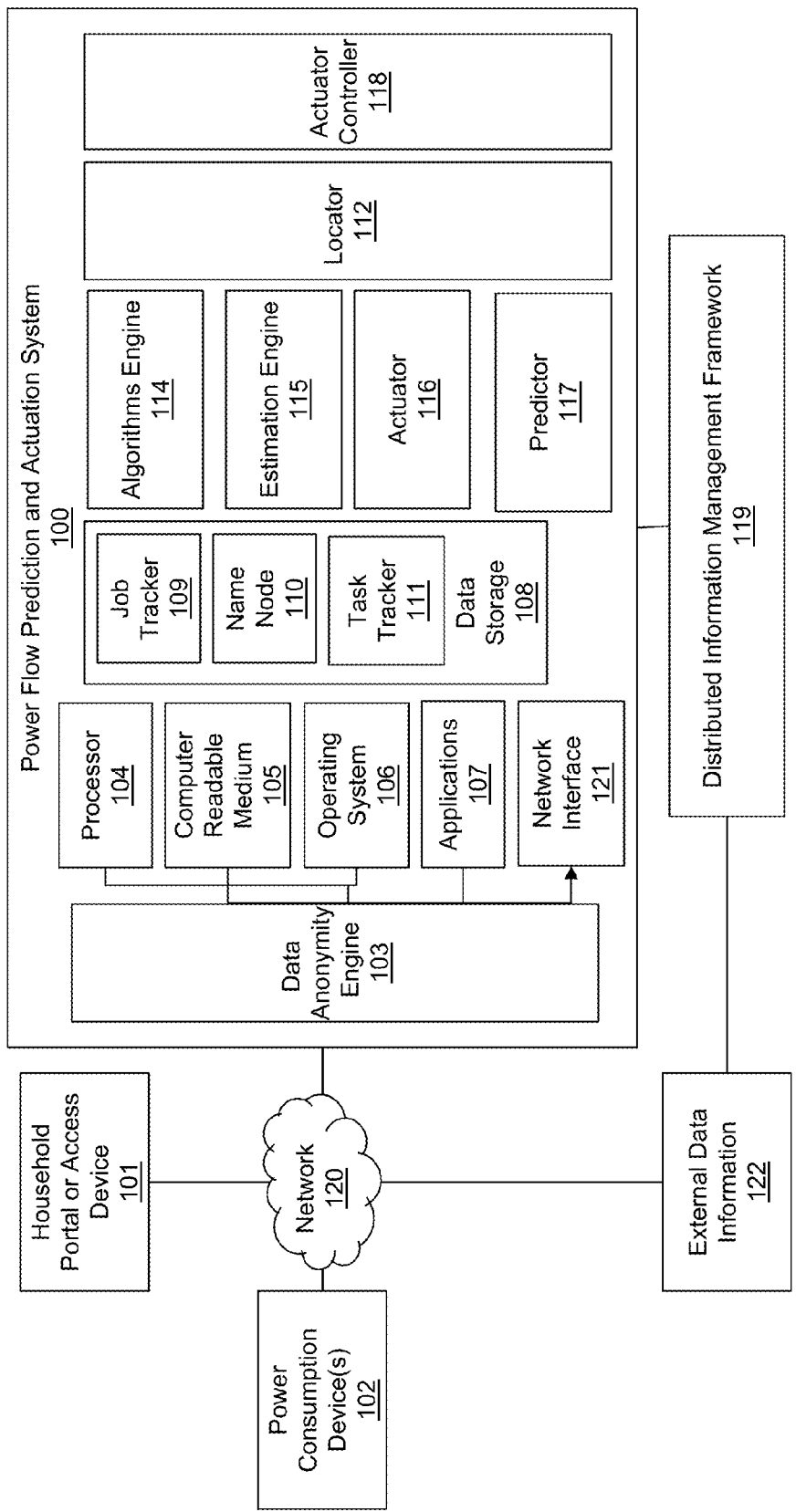
FIG. 1 is a block diagram of a power flow prediction and actuation system.

FIG. 1 is a block diagram of a power flow prediction and actuation system 100. The system 100 may be configured to gather data from multiple sources including an access device 101, also referred to as a household portal 101, power consumption devices 102 including but not limited to electric vehicles (EV), plug-in hybrid electric vehicles (PHEV) and EV/PHEV charge stations and other external data sources 122.

The multiple data sources may be used to gather location, power consumption data, and actuation control data of devices and send the information to the system 100. The household portal and access devices may include switches, gateways, hubs, routers and the like adapted to communicate via a network protocol, to intelligently store and route data based on subscriber-based messaging or other protocols.

The multiple data sources may include the household portal 101 and power consumption devices 102, which may communicate with the system 100 over a network 120 using any communication platforms and technologies suitable for transporting data, such as behavior data, data, geographic location data. Examples of networks may include wireless networks, mobile device networks (e.g., cellular networks), closed media networks, subscriber television networks, cable networks, satellite networks, the Internet, intranets, local area networks, public networks, private networks, optical fiber networks, broadband networks, narrowband networks, voice communications networks and any other networks capable of carrying data.

Data may be transmitted via data transmission protocols including, by way of non-limiting example, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), Device Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, signaling system seven ("SS7") technologies, Ethernet, in-band and out-of-band signaling technologies, and other suitable networks and protocol technologies.

The power consumption devices 102 may be associated with or include one or more access devices 101. An access device may include a sensor, meter, processing capability, electronic storage and memory, and other computing components. An access device may subscribe to one or more services (e.g., a wireless telephone or messaging service) provided over the network 120. Data provided from an access device or another source to the system 100 may be tagged to identify the power consumption device, the access device or other source of the data.

An access device 101 may include any device configured to perform one or more of the access device processes described herein, including communicating with the system 100. An access device may include a wireless computing device, a wireless communication device (e.g., a mobile phone), a portable computing device (e.g., a laptop), a portable communication device, a personal digital assistant, a network connection device, a data recording device (e.g., a camera, audio recorder, video camera), a vehicular computing and/or communication device, and any other device configured to perform one or more of the access device processes described herein.

The power consumption device 102 may include any devices that consumes electricity and may be used for household, such as household appliances, electric meters, cable, switch, power quality measures, transmitters, distributors, substations, sensors detecting weather, sensors detecting current time, sensors detecting arrival and departure time, location sensors, etc.

The system 100 may further include data storage 108 that stores data used by the system 100 to make decisions about power consumption and access devices ("devices") and aggregate household and societal-scale behavior. The data storage 108, for example, may store event data about current activity of a device, historical data that was used for previous decision making, data provided to or generated by devices and other information that may impact decision making, such as current weather, planned outages, etc.

The data storage 108 may include a distributed database system or other type of storage system. The data storage 108 may include one or more data storage media, devices, or configurations and may employ any type, form, and combination of storage media. The data storage 108 may also include one or more data storage for a job tracker 109, a name node 110 and a task tracker 111.

The job tracker 109 may monitor, assign and retain processing data jobs on behalf of the device. The data storage for name code 110 may monitor, assign and retain name codes of processing data on behalf of the device. The data storage for the task tracker 111 may monitor, assign and retain processing data tasks on behalf of the device. For example, the data storage may include a hard drive, network drive, flash drive, magnetic disc, optical disc, random access memory ("RAM"), dynamic RAM ("DRAM"), other non-volatile and/or volatile storage unit, or a combination thereof. Data may be temporarily and/or permanently stored in the data storage 108. The components of the system 100 may include software, hardware or a combination of hardware and software. The components may include machine-readable instructions stored on a computer readable medium and be executable by a processor or other processing circuitry to perform the functions of the system 100.

The system 100 may further include a locator 112 that determines the location of devices from sensor data. For example, sensors of the access devices 101 may provide the geographic locations of corresponding consumption devices 102. The sensors may operate on location technology, such as Geographic Information System (GIS) or Global Positioning System ("GPS") technologies, to determine the geographic location of the devices 102 according to determined coordinates. Other suitable technologies may be used, including principles of trilateration to evaluate radio frequency signals received by the consumption device 102 (e.g., RF signals in a wireless phone network) and to estimate the geographic location of the device 102. The geographic location data from the device 102 or sensors may be sent to the system 100 and stored in the data storage 122. The locator 112 may determine the geographic location of devices from this information.

The system 100 may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The system 100 may further include an actuator controller 118 which may create and receive data, including data that has been created or received using an access device. For example, the actuator controller 118 may receive data from the device 102, such as enabled device choices (e.g. "insufficient load of voltage available" signals) and organize the data for storage in the data storage 108. The actuator controller 118 may provide one of more functions, including but not limited to indexing, directing, processing, editing, rating, labeling, commenting, blocking, reporting, and categorizing data. The actuator controller may also determine a time of search, availability and updates at a consumption device in real-time. The actuator controller may also notify access devices of their actions and updates.

The actuator controller 118 may further trigger a search for consumption data from power consumption devices 102, and selectively analyze the data based on geographic locations of the consumption devices. Once triggered, for example, the system 100 may monitor for when a power consumption device enters within a predetermined level of electricity consumption and a determined target level of energy capacity. The monitoring may be performed within a predefined geographic proximity of a geographic location associated with the consumption device from where the power consumption data originated.

In response to detecting certain events within the power consumption data, the system 100 may initiate a search for electricity load, capacity and reserve information ("supply information") within a predefined geographic proximity between an origin of power capacity and a target location that needs additional power supplied to avoid a brownout or blackout. For example, the target location may be the location of the power consumption device or a group of power consumption devices. The search may extend to specified locations between the origin and target locations. The system 100 may search for information on the consumption data that is accessible to an access device within the predefined geographic proximity, and the consumption device may utilize the access device to request and receive the consumption data from the system 100.

The actuator controller 118 may also store consumption data received from the consumption device 102, and selectively distribute (or publish) the data to other access devices 101 based on geographic locations of corresponding consumption devices. For example, when an access device enters within a predefined proximity of a geographic location associated with particular consumption data, the system 100 may make the consumption data accessible to the access device. The system 100 may send a notification that the data is accessible to the access device once within the predefined proximity. The access device may, in turn and based on communication with identified consumption devices, send the consumption data (or other grid information) to those consumption devices that request the information. The power consumption devices, in some cases, may subscribe to periodic updates via messaging from access devices in closest proximity to the power consumption devices. The predefined proximity may change over time or be redefined by the system 100 or a user.

In this way, consumption devices 102 working in concert with access devices 101 may create and receive consumption data based on current consumption, target consumption and/or a transition state indicative of dynamic energy use. Target consumption may refer to anticipated or predicted levels of consumption or a desired level of consumption under ideal (or near ideal) power supply conditions. The transition state may include a stationary state or transition state updates from a current consumption to target consumption. The consumption data may therefore include information related to real-time consumption or current device activity, data associated with target consumption and with transition between consumption levels.

The consumption data and related information may be based on forecasts and forecast updates, which may be provided in real-time, with relation to current and future activities and device trajectories. Data may be communicated for current communications and communication threads in devices in real-time. Data may be distributed via multicast or unicast techniques. The availability of data may be selectively notified to consumption devices based on the consumptions, locations and settings validated with an account of respective consumption devices. Consumption and access devices may therefore share data with one another in connection with geographic locations.

The actuator controller 118 may provide tools for indexing consumption and related information on behalf of the consumption and access devices. The actuator controller may also facilitate inter-communication of the consumption and access devices. For example, a device that has been authenticated to publish data may index the data such as by editing the data, rating the data, or publishing a comment about the data to the system 100. The device that published the data may access the index and respond to the device that provided the index. Such communications between the devices may be processed as a communication-thread to which the device involved may be granted access. Indices may be updated and distributed in real-time. The index may include energy reserve updates such as reserve is empty, and updates related to load and capacity information and the like.

The system 100 may support a wide variety of applications and uses. In one example, a power consumption device (e.g., a household appliance) may utilize an access device to record energy consumption of that appliance in a household. The access device may be configured to detect the consumption at which the data was created, associate the data with the consumption, and post the data and location. This may be referred to as publishing location-based device consumption data.

Furthermore, another power consumption device may be associated with another access device within a predefined level of energy consumption associated with the published data. In such a case, the system 100 may send a notification of the accessible data to the access device, in response to which the consumption device may respond to controls sent by the access device to turn up, turn down, hold or switch-off itself off, for example. Furthermore, the consumption device may be able to view the data or make the data viewable to a user.

As another example, a consumption device may post usage data to the system 100 and subsequently use the published data as a consumption log. For example, the consumption device may access published data based on different consumption associated with the data and/or a period of time corresponding to power usage associated with the data. The published data may be presented in the form of a consumption log or in-take.

As another example, a consumption device may be used to a particular level of consumption and gain access to published data associated with the consumption. The consumption device may utilize the published data to plan and/or improve consumption activities. For example, published data may include recommendations or suggestions as to how to save energy with the consumption device. Such publishing may be provided by other users on the same or similar device and may be based on their experiences.

In yet another example, a data instance may be used to distribute local information. For instance, an organization may provide a data instance on the device for informational purposes, including information about voltage fluctuations, plan outages, power quality fluctuations, pattern of use, maintenance conditions, risk conditions and the like. The consumption device 102 that gains access to the published information may index and/or respond to the information as described above. For example, a consumption device viewing published data descriptive of consumption increase timeframes may notify the organization that published the data about current site conditions (e.g., the consumption is higher or load is lower than a certain threshold).

The system 100 may further include an algorithm engine 114 that may process, add, modify and apply data analyses models by applying mathematical techniques, alone or in combination with other techniques. The mathematical techniques may include, just by way of example, semi-supervised and unsupervised machine learning, stochastic gradient learning, queuing model, computational game theory and quantum statistical physics algorithms. The mathematical techniques may be executed on data received in real time from an access device, for example, by execution of the locator 112 and actuator controller 118.

For example, algorithm engine 114 may apply a statistical model based on, and to organize, the data for storage in the data storage 108. The algorithm engine 114 may provide data representative of the consumption data and associated data (e.g., geo-location data and/or other tagged data) to the system 100. The provided data, including consumption data, associated geographic location data, and any other data used for estimating, actuating and forecasting a list of power-consumption choices for each consumption device may be provided to the system 100. The algorithm engine 114 may prompt the consumption device for approval or confirmation before data is provided to the system 100. Alternatively, an access device may automatically provide the data to the system 100 once location data has been generated and associated with the consumption data.

The system 100 may further include an information management framework 119. The information management framework 119 may process, transmit and receive data over the network 120, including receiving data representative of consumption data and associated additional data, e.g., location data, from consumption devices. The information management framework may also provide data representative of consumption data to consumption devices 102 by way of the network. The information management framework 119 may include and/or support any suitable distributed data platforms and technology for communicating with and transporting data to and from consumption devices 102 over a network in unicast and multi-cast formation. The information management framework 119 may be configured to support a variety of distributed data platforms, protocols, and formats such that the system 100 may receive data from distributed consumption sources and send data by way of a variety of platforms (e.g., a mobile telephone service platform, a web-based platform, a subscriber platform(s) and the like).

The system 100 may further include a predictor 117 for making predictions. The predictor 117 may generate predictions for determining the current and next activity of a consumption device and provide continuous updates between the current and next activities. For example, the system 100 may determine current energy consumption, load, capacity and reserve levels of a power consumption device. The system 100 may further determine the current time at the power consumption device based on sensor data and other data received from the data sources.

In one example, the system 100 may compare with historical observed data, including power generation signatures or patterns stored in the data storage 108, to predict that a consumption device is executing a specific activity (e.g., heating water or toasting). The system 100 may make additional predictions about the future activity of the consumption device, such as the device 102 is likely to be used at certain time of the day and for a certain duration of time. The predictor 117 may operate in conjunction with an estimation engine 115 (or estimator) and an algorithms engine 114 for making the predictions. Examples of different functions and technologies for the predictor 117 are described below. The predictor 117 may execute a function or logic for making a forecast based on current data (e.g., event data) and/or historical data, and provide continuous updates in real-time data. The predictions and/or updates may be provided to the consumption and/or access devices that may further communicate the predictions and/or updates to other consumption and/or access devices in networked communication with the consumption and/or access devices.

The system 100 may include an estimation engine 115 (or estimator) for estimating the current and future demand, load, capacity, reserve, condition, life cycle, and risk of failures and exposure of a device. The estimation engine 115 may use consumption data and associated information, such as the geographic location, time, or other measured metrics, to make the estimations about the activities of the consumption device.

The estimation engine 115 may use a number of algorithms or functions, alone or in combination, including for example: Markov decision functions (e.g., Markov Chain Monte Carlo (MCMC)) executed on event data, "partial memory-based" Markov functions executed on historical data, sheaf-stack descent (SSD) functions to estimate aggregated functions and stochastic gradient descent (SGD) algorithms to estimate optimization of objective functions. The algorithms or functions may further include stochastic gradient boosting (SGB) functions to estimate decision trees and ranking, optimal control estimates (OCE) to estimate demand, capacity, reserve, pricing and metrics, and optimal power flow control (OPFC) to estimate to load and reserve balancing.

The algorithms and functions may further include Newton Raphson Method (NRM) to balance load and reserve in overlapping areas, a Bayesian Belief Network (BBN) to estimate current activity or make other estimations about a consumption device. For example, the estimation engine 115 may use event data, such as location-based dynamic behavioral data, from the data sources to predict device usage, recognize location-specific target activities and to respond with data and data updates within an ultra-short duration, such as real-time or near real-time. The estimation engine 115 may make these estimations even when geographic and temporal behavioral information is only partially available, which may include instances when information from some of the data sources may be missing.

The system 100 may further include an actuator 116 to trigger data execution. The actuator 116 may include a data actuator with a controlling mechanism to search a location where the gap between demand and load, capacity and reserve ("the demand-capacity gap") is likely to occur in a near-future time horizon. The actuator 116 may find available load, capacity and reserve in a particular location and a mechanism by which a data agent acts upon an environment. The data agent can be either an intelligence agent or any other autonomous system to perform search. The actuator 117 may further perform reads and writes, rotate, edit and may update data received from consumption devices on demand. The actuator 117 may send triggers to the device 102 to perform their tasks, and act upon any changes in the environment to calculate the appropriate response. The actuator 117 may be used for various forms of measurements, to give the warnings about safety or malfunctions, and to provide real time information of the task being performed by a consumption or access device.

The actuator 116 may further perform simulation to study position and orientation of a device 102. The actuator 116 may use, among other techniques, search-and-feed ("SNF"), biological-microhabitat ("BM") predation strategy for evolutionary biology ("PSEB"), queue theory ("QT"), optimal foraging technique ("OFT") and fractal design ("FD") methods to determine shortest and most optimal path for search in dynamic conditions of the demand-capacity gap, and to provide a dynamic optimal search result on load, capacity and reserve in neighborhood or close proximity areas of a power grid.

The actuator 116 may develop semi-supervised, unsupervised and autonomous models based on the data received from the device 102, to determine the shortest search path. The actuator 116 may develop dynamic predictive models and data values with dynamic distributed data for predictor 117. This method may be particularly advantageous over traditional search methods particularly when forecasting spatial-temporal energy demand, behavior, load, capacity and reserve information at a societal level is more precise in highly dynamic and uncertain conditions where data may be dynamic and more frequent at sub-second time horizon.

The predictor 117 may use the estimation engine 115 and the actuator 116 to predict power consumption choices, also referred to as target choices or a choice set, for a consumption device. For example, the predictor 117 may determine that a consumption device is likely to face unplanned outage, as estimated by the estimated module 115 and predict that the device has a risk of failure at a certain time. The predictor 117 may use a number of algorithms of functions, alone or in combination, to make dynamic predictions and to provide an optimal response as a feedback-loop for each consumption device modeled as a quantum candidate. The algorithms or functions may include, for example: Heisenberg uncertainty principles ("HUP"), M-Coupled Non-linear Schrodinger equation ("MCNSE"), combinatorial optimization ("CO") support vector machines ("SVM"), evolutionary game ("EG"), quantum statistical mechanics ("QSM") and stochastic statistical processes ("SSP").

The predictor 117 may further develop statistical models to calibrate use, queue, duration of use, risk of outage and post-outage stability conditions. The predictor 117 may further predict location-based target activities (e.g., EV/PHEV charging) and power consumption choices with a goal of dynamically and optimally sending additional data to consumption and/or generation devices. The data may include, but not limited to, messages, audio-video content, photos and the like. For example, based on prediction of the target activity, the system is operable to send the data dynamically and optimally in the form of message to EV/PHEV charge stations. Such a message may be that "this station will close for 15 minutes at 7:30 PM" or an audio-video data to an EV car including the nearest location of an EV/PHEV charge station. The data may further include a picture sent to a distributed generator regarding available energy reserve, and other capacity information and data.

The predictor 117 may use Heisenberg uncertainty principles and model each consumption device as a quantum particle, to predict activities of a society of devices in household. Based on the predictions for the society, an optimal set of power consumption choices may be determined for a consumption device or for a service associated with the power consumption device. For example, if the predicted activities for a society indicate that a large number of devices are in use, the predictor 117 may modify the target use time for the consumption device, to eliminate the likely outages or likely failure of the consumption device. The predictive analysis may also apply to preventing likely outages or failure of a group of consumption devices. A power service operation authority may use predictive information (e.g., events and anticipated outcomes to those events) to balance the electricity load locally as well as at a societal level. Also, HUP may be used to estimate the state of a consumption device, which may include a condition related to an activity, e.g., a state of charge needed to provide an output for a motor.

The predictor 117 may use Schrodinger Equation ("MCNSE") techniques to systemically and dynamically predict both time-dependent and time-independent behavioral changes attached to a series of stationary states as each stationary state is classified and understood. The behavioral information may be restricted to smaller sets, and since behaviors do not have exactly pre-determined properties (e.g., impact of weather on use of device) and when they are measured, results are combined with stochastic and optimal control methods.

Using the HUP for position and momentum, the products of uncertainty in position and momentum allow analytics continuation (a technique to extend the domain to infinite series representation) and germ (a mathematical notion of an object in/on a topological space captures the local properties of the object). This combination of methods may be particularly advantageous over traditional discrete data aggregation. The advantage may derive from forecasting spatial-temporal behavioral information as a formation of a community: devices in the community are continuously used in households that are continuously exercising behavior that is aggregated at a societal level in a dynamic environment, even when only partial information is made available.

The predictor 117 may also execute combinatorial optimization ("CO"). The combinatorial optimization may use the predictions generated by the system 100 to finding "largest," "smallest," "optimal" and "Satisfactory" use of energy at device, household and societal levels for deciding when certain criteria may be met. The predictor may further construct and analyze objects meeting the criteria such as by selecting a next activity choice option that is modified based on the predictions. Combinatorial optimization combined with quantum statistical mechanics ("QSM") allows to dynamically-create new methods for analyzing decision trees for the predictor 117, refine practical search algorithms for the actuator 116 and to determine formulas and estimates of analyses of algorithms for the algorithm engine 114. This combination of methods may be particularly advantageous over traditional accuracy when forecasting spatial-temporal energy demand, behavior, load, capacity and reserve information of a societal-scale. The combination may also be dynamic and more frequent, e.g., at a sub-second time horizon.

The system 100 may include a processor 104, such as a central processing unit, application specific integrated circuit (ASIC) or other type of processing circuit with which to execute the processes and methods disclosed herein. The processor 104 may include one or more processors that may be executed in combination or in a distributed environment.

The system 100 may further include a network interface 121, such as for connection to a Local Area Network (LAN), a wireless 802.11x LAN, a 3G or 4G mobile WAN or a WiMax WAN, and a computer-readable medium 105. Computer readable medium 105 may be any suitable medium that stores machine readable instructions to be executed by processor(s) 104. For example, the computer readable medium 105 may be non-transitory and/or non-volatile, such as a magnetic disk or volatile media such as RAM. The instructions stored on the computer readable medium 105 may include machine readable instructions executed by the processor(s) 104 to perform the methods and functions of the system 100. The computer readable medium 105 may include solid-state memory for storing machine-readable instructions and/or for storing data temporarily, which may include information from the data repository, for example for performing project performance analysis.

The system 100 may further include a an operating system 106, such as MAC OS, MS WINDOWS, UNIX, or LINUX, and one or more applications 107, which include a software application providing features of the system 100. The operating system 106 may be multi-user, multiprocessing, multitasking, multithreading, real-time and the like. The operating system 106 may execute from the computer-readable medium 105.

The system 100 may include a data anonymity module 103 such as data encryption, decryption, private-public key management, metadata to make device 102 data more private and invisible to human intervention. Anonymity module 103 may also include software, processes, protocols and methods to protect, hide, unprotect and unhide household and choice set data.

Figure 2:
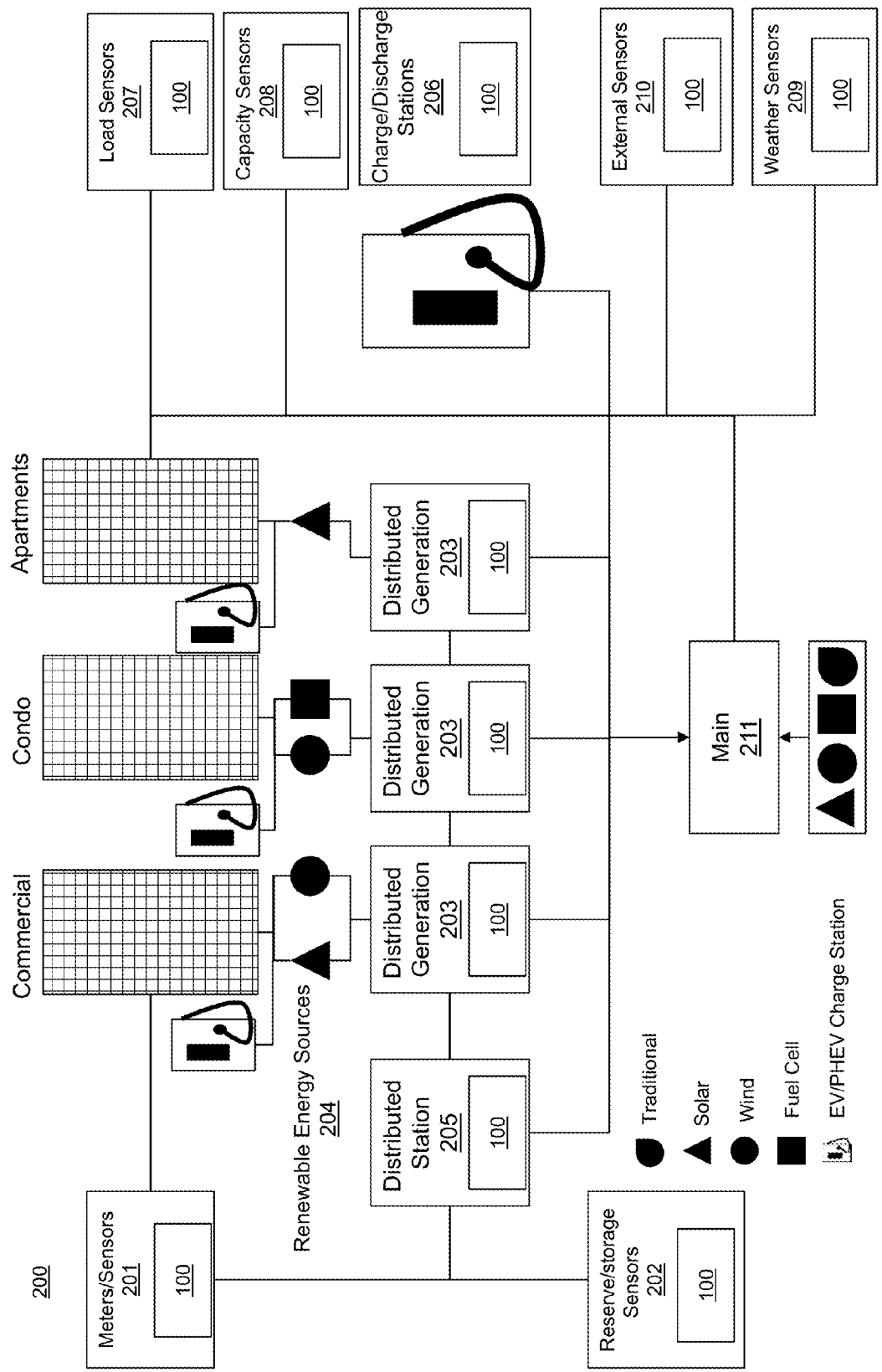
FIG. 2 is a block diagram of a distributed information network at a societal or community level in which the system of FIG. 1 may be deployed.

FIG. 2 is a block diagram of a distributed information (or collaboration) network 200 at a societal level in which the system 100 of FIG. 1 may be deployed. The collaboration network 200 may include additional components not shown and some of the components described may be removed and/or modified. For example, the collaboration network 200 may represent a server that runs the system 100 or the collaboration network 200 may include one of multiple distributed servers that perform the functions of the system 100 in a distributed computing environment.

The collaboration network 200 may include functional systems such as meters and sensors 201 that employ instances of the system 100. The meters and sensors 201 may record, modify, update, send and receive energy consumption data to/from each consumption device 102. The energy consumption data may be aggregated at household or unit, up to communities and on to other distributed systems in the collaboration network 200. The other distributed system may include, for example, storage sensors 202, a distributed generation system 203, renewable energy sources 204, distributed stations and substations 205, EV/PHEV charge and discharge stations 206, load sensors 207, capacity sensors 208, weather sensors 209 and other external sensors 210. The components and sensors of the distributed generation system 203 may be coupled with or integrate instances of the system 100 that record, modify, update send and receive data to/from other of the systems 100.

The distributed information management framework 119 in the system 100 may connect other devices and systems into the collaboration network 200 via a network connected to main energy grid system 211. Some internal systems and consumption devices 102 may be connected to the main grid system 211 via a LAN and external system and the consumption devices 102 may also be connected via the Internet. The internal system and the external system may include the household portal 101 and external data sources 120 shown in FIG. 1.

Figure 3:
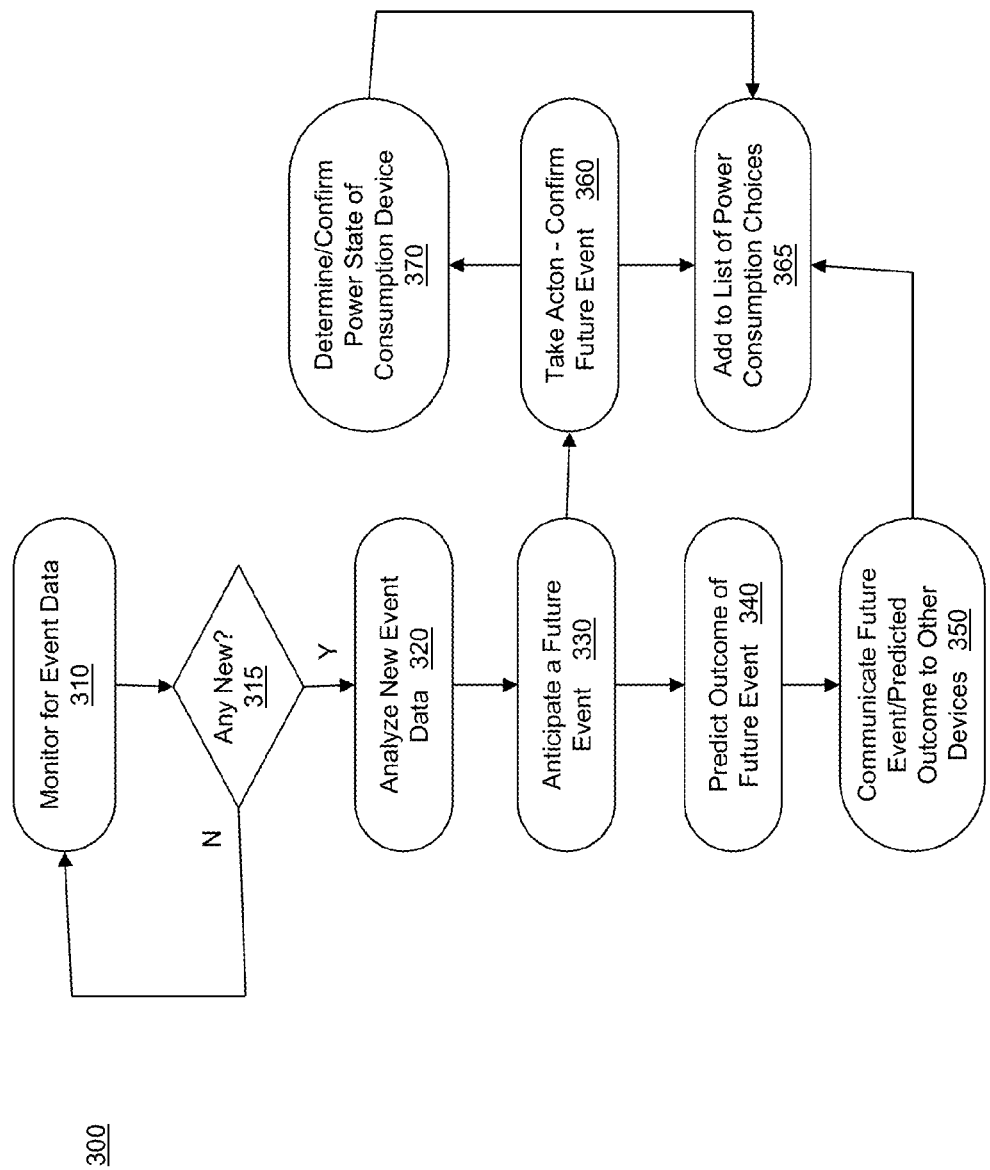
FIG. 3 is a flow chart of a method for dynamic distributed data collaboration between consumption devices of the distributed information network of FIG. 2.

FIG. 3 is a flow chart 300 of a method for dynamic distributed data collaboration between consumption devices of the distributed information network of FIG. 2. The collaboration may include grid network governing protocol (GNGP) to maintain communication between multiple instances of the system 100, for example, via meters and/or sensors 201 that incorporate the system 100. Accordingly, the method 300 may be performed by the system 100 shown in FIG. 1.

The system may monitor for new event data coming from a consumption device (310). The new event data may include the current location (e.g., geographic location) of the device, current time and other functional metrics that may include sensor-measured metrics and operating information of the consumption device. The location and time, for example, may be determined based on location and time data received from an access device for the consumption device. If no new event data is detected or observed (315), the system 100 may loop back to continue monitoring for new event data (310).

The system 100 may then analyze the new event data to determine power consumption behavior of the consumption device over time (320). A new event may be indicative of current activity of a consumption device, which may include location data and/or other measured metrics that may indicate such activity.

The estimation engine 115 may use a Bayesian Belief Network (BBN) or another type of estimation technique to estimate the current activity of the consumption device based on the event data.

The algorithm engine 114, working in conjunction with the estimation engine 115, may use a semi-supervised or an unsupervised algorithm to create new algorithms or to modify existing algorithms that may estimate the current activity based on the event data.

The predictor 117, furthermore, may use a HUP or another type of analytical method to estimate the current activity based on the event data. The predictor 117 may determine a probability that the consumption device is performing a current activity, such as whether the device is in route to work. If no new event is observed, the system 100 may continue to monitor for new event data. The system 100 may also use the last known state or accept a user input of the state.

In response to the analysis, and based on the determined power consumption behavior of the consumption device, the predictor 117 may predict the occurrence of a future event (330). The future event may include, by way of example, a surge in power and/or a determined consumption of power during a determined period of time. Future events predicted for multiple consumption devices may be aggregated to predict a corresponding future event for a household, unit, group of units or a community.

The actuator 116 may use an optimal foraging technique ("OFT") or another type of actuation method to confirm the future event for the consumption device. Furthermore, the actuator 116 may request a confirmation of the future activity based on the event data (360). If no new action is initiated, with an observed new event, the system 100 may use the original state or accept a user input of the state.

The predictor 117 may then predict the outcome of the future event based on an analysis of past behavior data of the consumption device and the received new event data (340). Such a prediction may include an introspection of likely behavior to estimate the outcome of the anticipated event. For example, the estimation engine 115 may apply Markov Chain Monte Carlo (MCMC) or state variable machine (SVM) or another type of estimate based on the event data, which may include behavioral patterns, to estimate the current activity of the device.

Behavioral data may include historical data for the consumption device, including previous consumption traversed and previous activities executed by the consumption device. Pattern recognition based on historical data, which may be performed by an SVM estimate, can be used to analyze historical data to predict the current or next activity. Another example of a prediction may include predicting a surge in power at a geographic location at a future moment in time responsive to an aggregation of anticipated events and predicted outcomes. If no new anticipation is initiated, with observed new event and new action, the system 100 may use the original state or receive a user input of the state.

With further reference to FIG. 3, the system 100 may further include taking an action or actions to confirm the future event (360). For example, an actuation may be generated to determine the next future activity of the device, such as whether the device will likely to fail due to strong weather conditions.

In response to the actuation, the system 100 may modify the list of power consumption choices or confirm the choices (365). The system 100 may also generate another actuation. For example, if the device indicates likely to fail due to strong weather condition, the next list of choices may identify an alternative consumption device within range and/or generate attribute-related actuation, such as whether the consumption device desires better quality or lower energy load. Also, actuation may be generated to determine or confirm a power state of the consumption device (370). To illustrate, suppose one of the actuators finds that an EV/PHEV charge station may soon become "unavailable" due to rain. The actuator 116 may identify the other EV/PHEV stations within the location range. The actuator 116 may then find energy consumption of the other EV/PHEV stations and determine if they would require additional power and/or better power quality to substitute for the EV/PHEV station that is likely to be unavailable.

With further reference to FIG. 3, the predictor 117 may apply one or more predictors to determine the list of power consumption choices or options. Additionally, the state determined at step 370 may be used to determine the list of power consumption choices for future activities (365). An example of determining the list of choices is further described with respect to FIG. 5.

Figure 4:
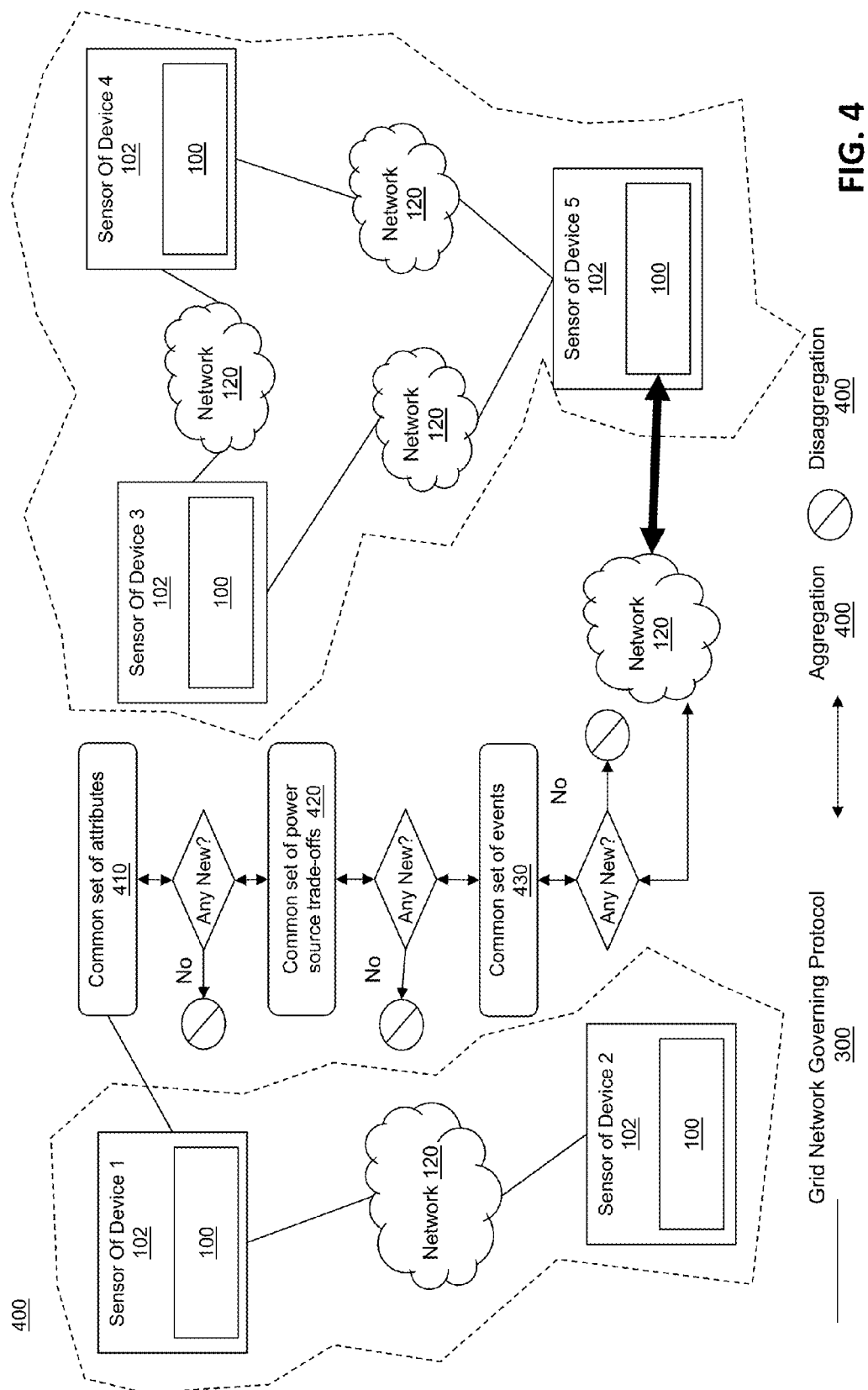
FIG. 4 is a flow chart of a method of dynamic aggregation and disaggregation of data from consumption devices in a distributed data collaboration within the network of FIG. 2.

FIG. 4 is a flow chart 400 of a method of dynamic aggregation and disaggregation of data from devices in a distributed data collaboration within the network of FIG. 2. FIG. 4 illustrates an aggregation of a new device 102 or new collaboration network 200 and also disaggregation of a new device 102 or new collaboration network 200. The aggregation or disaggregation may be executed by a system 100 for determining the GNGP maintained between groups of sensors and/or devices across one or more networks that may provide an intended outcome. The intended outcome may include events determined at step 330 of the method of FIG. 3. The GNGP may include an estimation of a state for each event. The GNGP may be used for the power state determined at step 370 of the method of FIG. 3.

With further reference to FIG. 4, a system may aggregate a common set of attributes, which may be determined for each sensor or meter (410). The attributes may describe a grid property or service associated with an event. A set of attributes may includes one or more attributes, such as one or a combination of physical attributes, (size, power, etc.), economic attributes (price, energy saving, etc.) and functional attributes (nature of use, quality of power, etc.). For purposes of explanation, each attribute affiliated with a list of power consumption choices may be expressed as j . . . J for each respective attribute having scale (e.g., high-medium-low) of m as shown in FIG. 5.

A power consumption device 102 may then determine existing power source trade-offs (420). The trade-offs may describe an attribute (e.g., quality of power) or a set of attributes that is used and shared in exchange for another attribute (e.g., amount of reserve) or a set of attributes with another device 102. A set of trade-offs may comprise qualitative (service, power quality, etc.), quantitative (voltage, watt, etc.) and content-driven (load, capacity, etc.). For purposes of explanation, each power source trade-off may be expressed as s . . . S for each respective attribute 401 as shown in FIG. 5.

The power consumption device 102 may then determine a common set of events (430). The events may describe use (heating, cooling, etc.) or a pattern of usage (frequency, time of use, etc.) that is used and shared with other devices. A pattern of use may include behavioral patterns (use during day, week, month, etc.), attitudinal patterns (based on comfort, time savings, etc.) social patterns (such as similar use, neighbor use, etc.). Each event in use may be expressed as k . . . K for respective power sources trade-offs as shown in FIG. 5.

Figure 5:
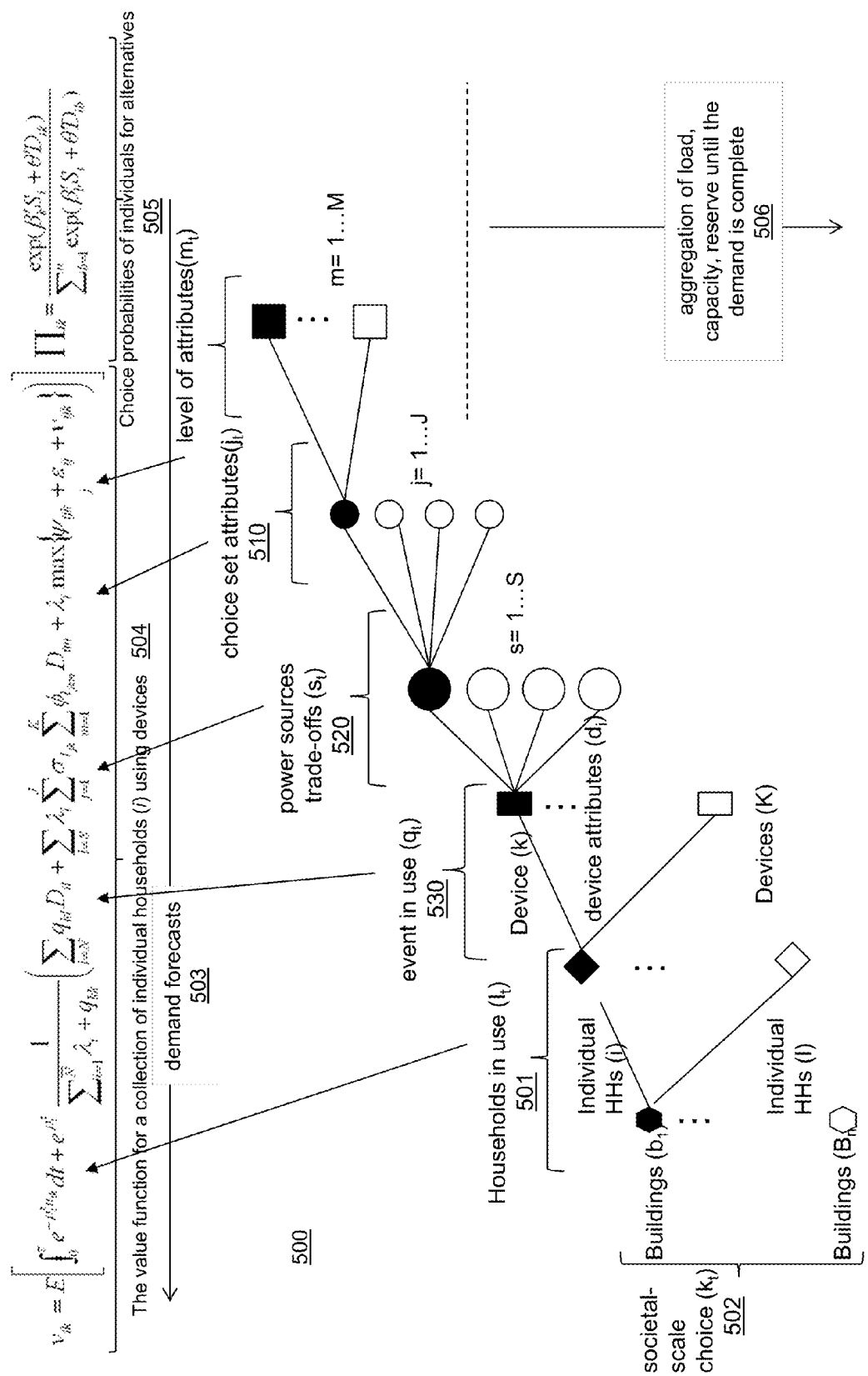
FIG. 5 is a flow chart and associated algorithm of a method for dynamic aggregation and disaggregation of consumption data at device, household and societal levels for power distribution estimations.

FIG. 5 is a flow chart and associated algorithm 500 of a method for dynamic aggregation and disaggregation of consumption data at device, household and societal levels for power distribution estimations. The aggregation of consumption data into a societal (or community) level may be used to determine a list (or set) of power consumption choices or to determine data to distribute for a particular time and location. The method may employ a micro-array for quantum statistical mechanics ("QSM") to model each consumption device as a quantum candidate, e.g., as a particle, in order to predict activities of a society of power generation and power consumption devices. Based on societal-scale predictions, an optimal set of consumption choices may be determined at household or unit level (501) and an optimal set of consumption choices for a community may be determined at a societal level (502). The method, furthermore, may be used to determine the list of consumption choices as disclosed with reference to step 365 of the method of FIG. 3.

The demand forecast equation 503 at a societal level may determine a value for each household (or unit) as a function of value function 504 and choice probabilities for alternative variables 505. The value function is the expected level of satisfaction for a household, which may be related to an event in use of a consumption device (530). For example, a value may be whether to purchase an expensive set of energy sources for consumption devices, between main traditional 211 and renewable energy 204 sources. Examples of the alternative variables 505 may include source of power, choice attributes or variant alternatives (e.g., heater uses to traditional energy source and air conditioner uses renewable energy source) that are available in the choice set for a consumption device or a user of the consumption device to exercise a preference. The choice probabilities 505 may include bargaining variables, such as coupons, discounts, auction-bids, promotions that are available for devices to exercise preference, or any variable involving an interaction of a consumption device to obtain power or a service.

The method may aggregate load, capacity and reserve of various power sources (e.g., main traditional 211 and renewable energy 204 sources) (506). The method may execute a stochastic subprocess to determine expectations by updating the probability of a power device (k) being in an observed state at time t. The cumulative probability may be determined from the probabilities determined at for individual power consumption devices (505). An aggregation factor may include a multi-dimensional optimizing factor determined using Monte Carlo Markov Chain, Hidden Markov Model (HMM), quasi-Newton or another OCE method (504) to find the optimal weights at each function gradient of a location-based activity-based load, capacity and reserve of power.

At 504, the quantum candidates may be aggregated for load, capacity and reserve into societal-scale as a function of one or more of time, location, transition and constraints. The aggregation 506 may include an aggregation of each decision of power consumption devices at a household level (501) as well as societal level (502).

For example, an information flow for a device aggregated to another device using the sheaf method of transmitted data $z=(zs_1; \ldots; zs_\alpha); zs_i \epsilon k^n_{si}; s_i \epsilon S;$ may be defined by an assignment $\Psi(e) \epsilon k^{cap(e)}$ for each edge $e \epsilon$ satisfying the flow conditions. The flow conditions may include the data that are related by local coding maps $\Psi_v$ at all vertices v. More specifically, for $e=|vw|$ and $e_i \epsilon ln(v;)$ $(i=1; \ldots; K);$ which may be expressed as:

$$\amalg_{v:Y' \to Y} A(Y') \xrightarrow[\eta]{\zeta} \amalg_{(Y,p)} A(Y) \xrightarrow{\chi} P \otimes yA$$

Where $P \otimes yA$=local information flow probability aggregated in a set y or $L_A(P)$.

The societies determined by data sheafing may be used to predict activities for the societies. Based on the predictions for the society, an optimal set of choices may be determined for a consumption device. For example, if a consumption device is part of a society determined to be heating the house, an optimal set of power consumption choices for a device in the society may be based on the number of devices in the society, the load capacity, reserve and the like. Also, data may be delivered to the consumption device that may indicate usage, load capacity and choices for other heating sources, such as gas heater or standalone heated air.

Figure 6A:
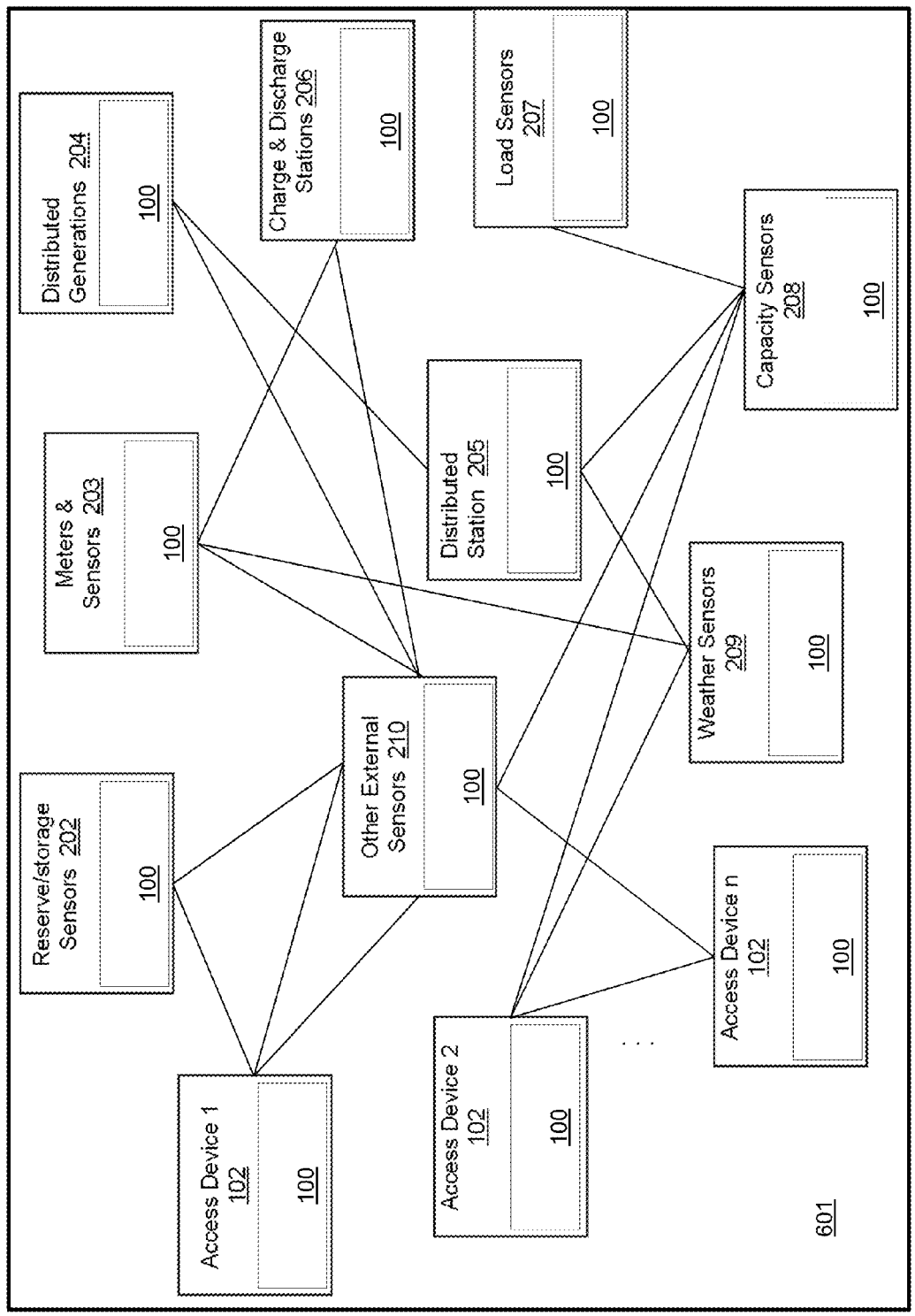
FIGS. 6A, 6B and 6C are block diagrams of examples of dynamic distributed estimation with distributed data collaboration for power flow predictions at, respectively, device, household and societal levels.
Figure 6B:
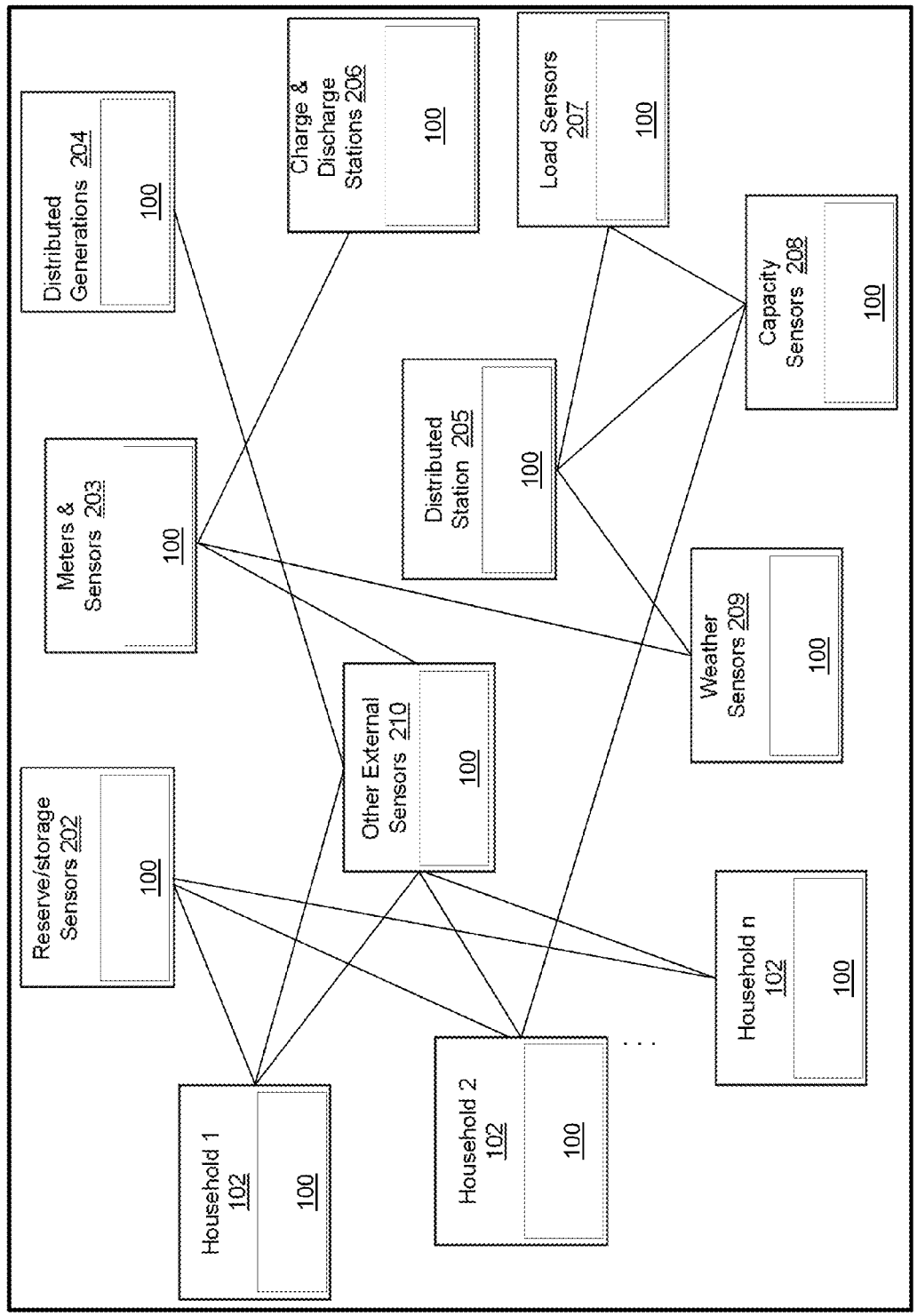
Figure 6C:
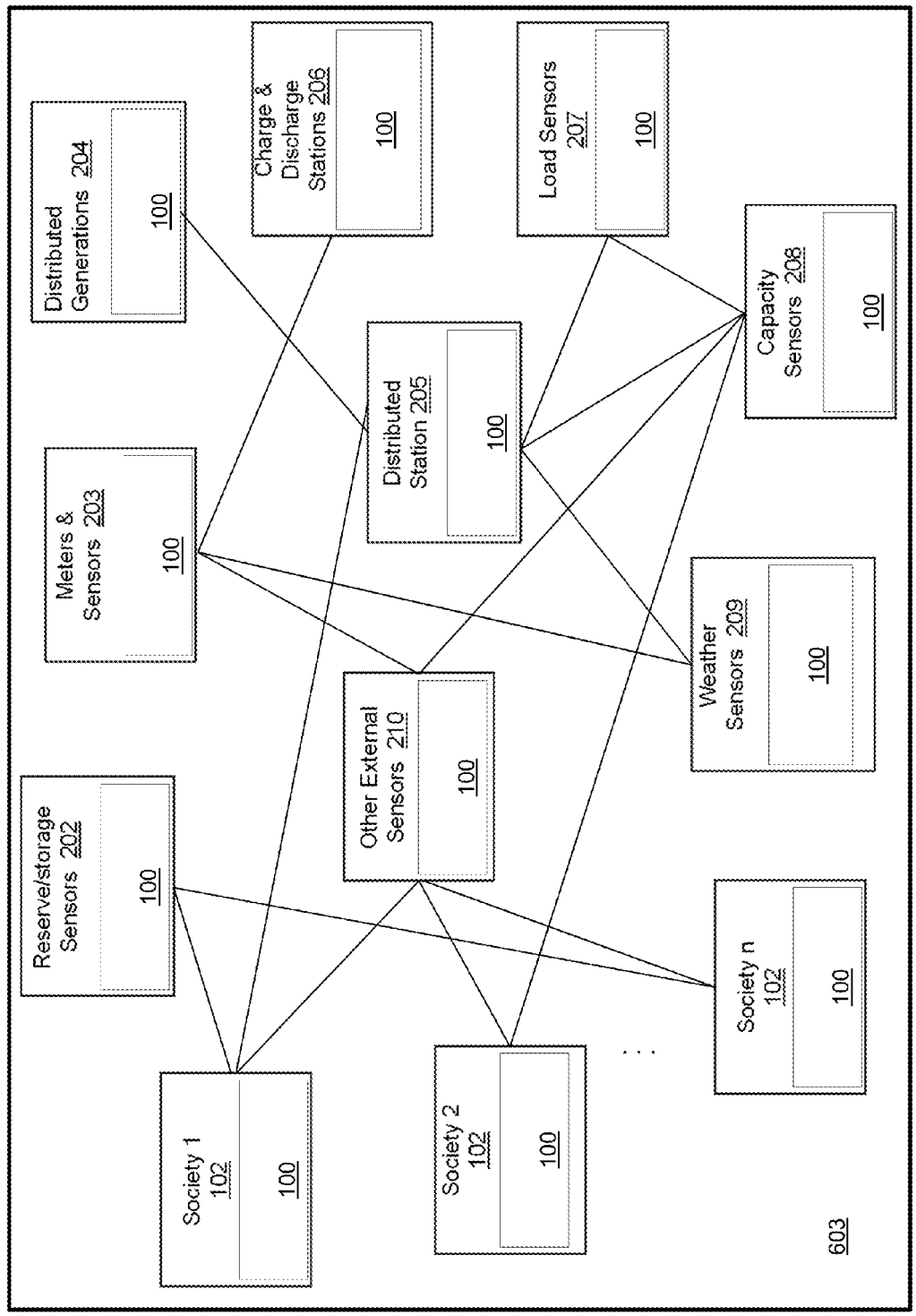

FIGS. 6A, 6B and 6C are block diagrams of examples of dynamic distributed estimation with distributed data collaboration for power flow predictions at, respectively, device, household and societal levels. More specifically, the block diagram 601 of FIG. 6A demonstrates formation of data collaboration societies (or communities) in relation to other power consumption and generation devices. The block diagram 602 of FIG. 6B demonstrates formation of data collaboration societies in relation to other households of units. The block diagram 603 of FIG. 6C demonstrates formation of data collaboration societies in relation to other societies or communities (e.g., a collection of households or units).

Figure 7:
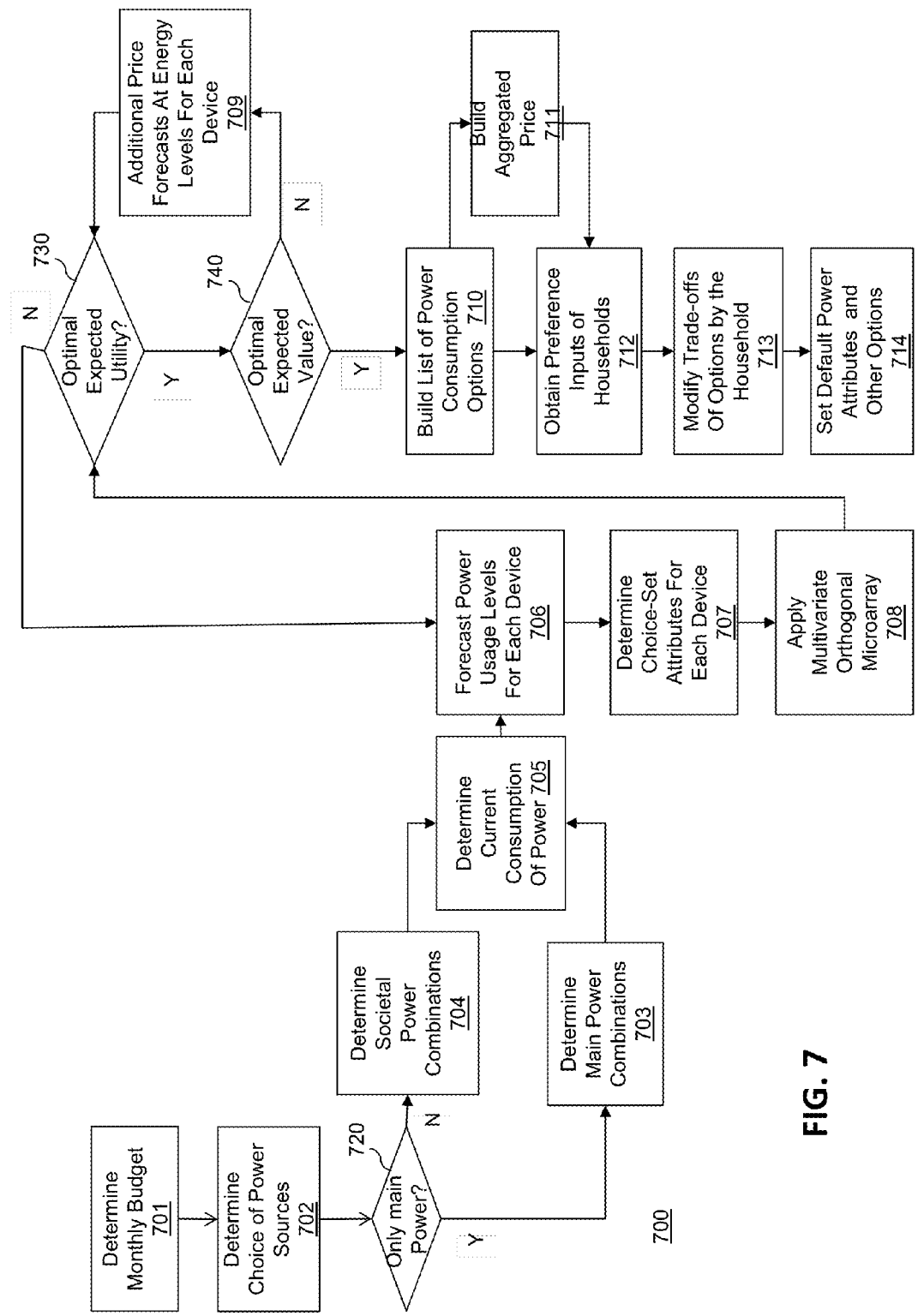
FIG. 7 is a flow chart of a method of estimation to determine power usage choices selectable by users for energy consuming devices at household and societal scale.

FIG. 7 is a flow chart 700 of a method of estimation to determine power usage choices selectable by users for energy consuming devices at household and societal levels. The method may be executed by the system 100 and may be operable to provide consumption data based on location and behavioral information.

The system may determine household monthly budget or willingness to spend on electricity (e.g. monthly electricity bill) (701). The access device may detect its current geographic location and send the location to the system 100. For example, an access device may transmit a location status communication including location status information to the system 100 using the information management framework 119. The access device may provide location status information proactively or in response to a request from the system 100.

The system may further determine whether the consumption device intends to receive power from the main traditional 210 or renewable energy 204 sources (702). This determination may be based on the current location of the consumption device, proximity to a target location, the state of the device and other behavioral information preferred by the household for the consumption device.

The system may then determine whether the power consumption device is qualified to draw from only main (traditional) power or may also be qualified to draw from additional (renewable) sources of power (720). If only from main traditional power, the system may present main power combination choices for selection (703).

If the consumption device qualifies, the system may further provide trade-off combinations of renewable energy 204 available at the societal (or community) level to the access device associated with the consumption device for user selection (704). The trade-off conditions may be determined as associated with the target location, such as trade-off conditions published by a different device or other entity that is associated with the target location. The method of FIG. 7 may be repeated as the location of the consumption device changes.

Referring back to step 702, the system may determine whether the consumption device qualifies to receive power for a target location. This determination may be based on whether the target location of an access device is "proximate" to a geographic location associated with a power attribute. A power attribute may include a geographical location of source, voltage, watt, load, quality of power, a state, and the like. One or more questions may be posited to determine if the consumption device qualifies based on the attributes associated with the energy attributes. "Proximate" may refer to the target location of an access device being within a predefined geographic proximity. The proximity may be defined in any suitable way, including as any location that is located within a specific distance (e.g., radial distance) of the target geographic location and/or dynamic geographic location. For example, the target radial distance may be set as 50 kilometers or 100 kilometers or another distance based on power attributes such as quality and location of the power generations. Other factors may also be considered.

The system may determine and track the current activity and power consumption of the consumption device (705). The determination may be made, for example, as a result of received confirmation or due to the decisions made at steps 703 and 704. The system may further forecast power usage levels for each power consumption device 102 to which associated consumption data is available (706), as has been previously discussed.

The system may further determine a list of power consumption options or choices for a next activity or event to be performed by the device based on the current activity of the consumption device, its location and behavioral data for the consumption device (707). Predictor 117 may employ HUP or other types of targeting methods to determine the list of consumption choices of the next activity. For example, if the current activity is that a generation device is charging a car, the set of choices to a car owner may include different charging duration options. The different options may be targeted by one or more targeting methods. The list of consumption options may be supplemented with energy or power source trade-offs about each option, which can be related to the current and/or next activity. For example, the power may be related to the different charging duration options, such as the estimated time of charging completion of the car, commercial vehicle, and the like. The power may also be related to energy from other devices, such as load, capacity and reserve availabilities.

Furthermore, the estimation module 115 may use a MCMC target method to identify the best choices for consumption or generation devices based on aggregate target consumption data at a household and at a societal level of devices performing similar activities in the same or proximate location. FIG. 5 shows an example of a method for determining societies using MCMC and using the societies to determine the list or set of consumption choices.

The system may further apply a multivariate orthogonal micro-array (MOMA) method to create the list of consumption options (708). For example, the system may determine that, based on the age and configuration of the device performing a generation activity, the activity can be best fulfilled by a better quality source of power such as renewable energy sources 204 as opposed to main traditional energy sources 211. The state of a device may represent the age and configuration of the device. For example, the state may represent a level of satisfaction for a particular choice in the choice set that was performed by the device. The MOMA method may include all the possible permutation and combinations of choice attributes (510) and power source trade-offs (520) and activity or events of the consumption device (530). The permutation and combinations may be based on the state of the consumption device and exclude certain permutations and combinations of the consumption device to determine the optimal list of consumption choices that meet the monthly budget (701). The state may be stored as historical information.

The system may further determine if the power and load levels are optimal for expected utility, e.g., expected power consumption demand (730). If not, the system may go back to step 706 and continue to forecast off the power consumption data as previously discussed. If yes, however, the system may continue on to determine whether power and load values are also optimal (740).

If the power and load values are not optimal, the system may determine additional price forecasts of the energy for a future period based on likely power consumption by the consumption device (709). Otherwise, if the power and load level values are optimal, the system may continue to build the list of power consumption options (710). The predictor 117 may use SSP on the likely consumption, load capacity and reserve to predict the future price of energy at device level.

The system may further determine aggregated price at household and societal levels of the power consumption (711). The estimation engine 115 may use OCE to estimate aggregated pricing and policies for a future period based on likely consumption the power consumption device 102.

The system may further determine the preference of a household based on historical activity, including power consumption, of the consumption device (712). The estimation engine 115 may use OCE and BBN to estimate household preferences for a future period based on historical and the predicted future consumption the device 102. The system 100 may provide the preference of the household and the list of consumption options to the household portal 101, for user selection.

The system may further determine when the user preference regarding a consumption activity of a consumption device is modified in the household portal (713). This modification may be made with relation to power consumption trade-offs. The system may receive the selection of a modified activity of the consumption device 102 from the household portal 101 (e.g., household chooses washer-dryer to be used on weekdays instead of weekends) by the household within an additional power consumption option to meet the monthly budget.

The system may further determine the list of consumption options as related to energy attributes of consumption and generation devices and in relation to a monthly budget, and set these and other selected options as a default list of consumption options for the household (714). This default list of options may be sent to the household portal 101 and made available to the access device 101 and other devices 103. The system may maintain and monitor the activities of the consumption devices, so that any deviation from the preferred choice set may be flagged and sent as an "alert" to the household portal as well notified at the societal level.

Distribution of an energy attribute may include making the energy attribute accessible to an access device. This may be performed in any suitable way. In certain embodiments, when an estimate is determined, a copy of a neighboring energy attribute may be automatically provided (e.g., downloaded) to the access device. In another embodiment, to access a power attribute, option selection data may be stored and updated for a consumption device with appropriate permissions settings and/or with links to appropriate decision-making probabilities on power attributes. For example, a link to a power attribute associated with a target geographic location may be inserted into a profile associated with a user ID of a consumption device in order to make the power attribute accessible to the access device associated with the consumption device.

The system 100 may further configure power attributes to provide notifications to one or more access devices indicating that published energy has been made accessible. For example, the system 100 may provide a notification to an access device indicating that the power attribute associated with a target location has been made accessible to the access device. The notification may include information associated with the power attribute, including a description provided as a trigger end-state for the consumption device, a geographic location or any other data associated with the power attribute.

The access device may receive the notification, and the device may elect whether to retrieve the accessible power attribute. In some embodiments, current geographic proximity to the geographic location may be requisite for accessibility to the associated power attribute and in other embodiments, once accessibility to energy is granted, accessibility is maintained for a predefined length of time, such as a day, week, month, or indefinitely. Accordingly, a consumption device may have access to power associated with a geographic location based on past or present detected proximity of the access device to the geographic location.

Figure 8:
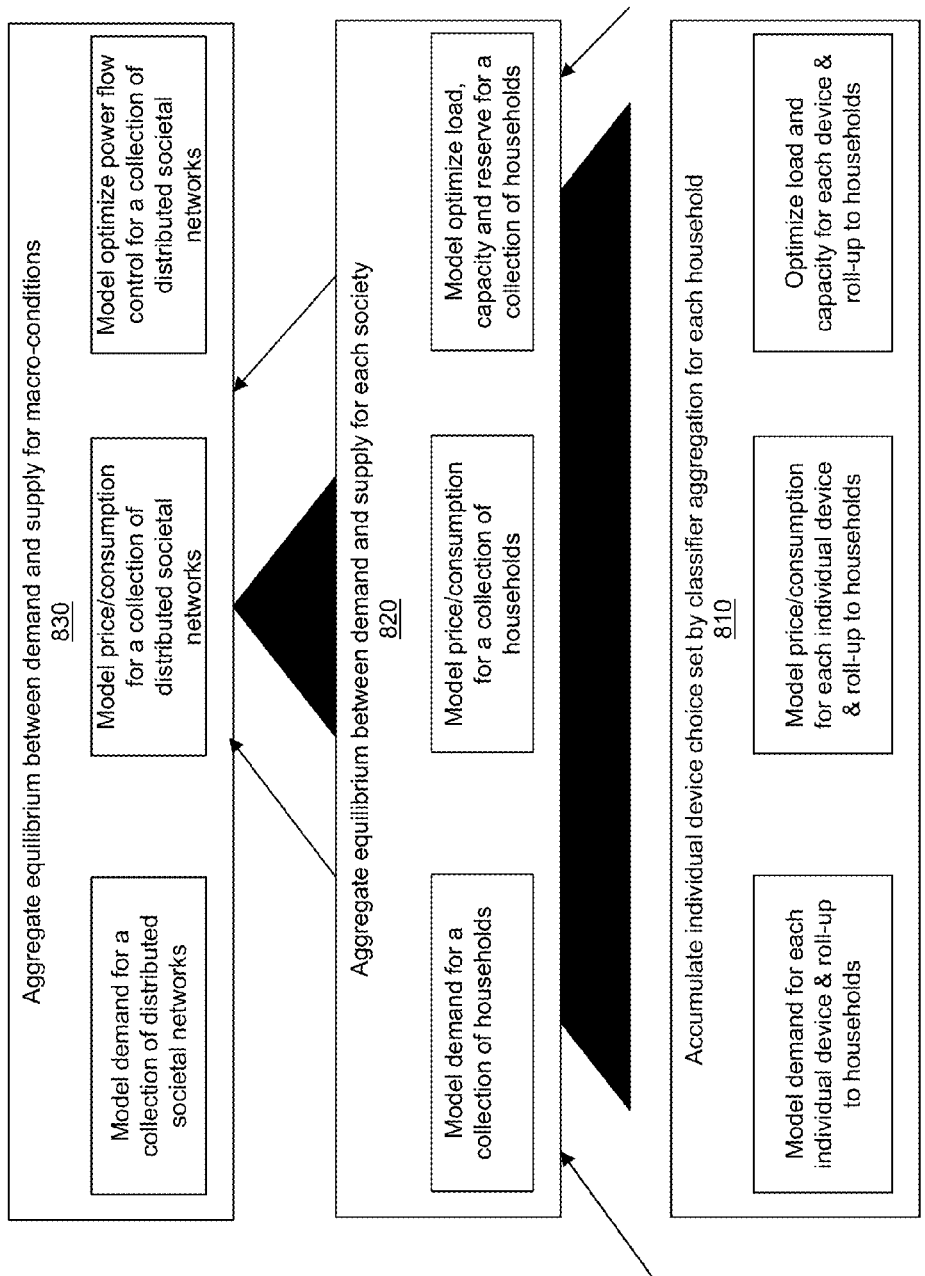
FIG. 8 is a flow chart of a method of estimating aggregated equilibrium of demand, load, capacity and reserve at household, societal and macro levels.

FIG. 8 is a flow chart 800 of a method of estimating aggregated equilibrium of demand, load, capacity and reserve at household, societal and macro levels. The system 100 may determine the aggregated demand based on consumption options as power attributes at the household level (810). The system may also determine the aggregated price per consumptions based on power attributes at the household level. Based on aggregated demand and aggregated price, the system may further determine the aggregated load and capacity required at the household level. The algorithm engine 114 may use semi-supervised or unsupervised machine learning techniques to develop a model of aggregation and the estimation engine 115 may use OCE to estimate aggregated load and capacity conditions at the household level.

The system may also determine the aggregated power demand from the list of consumption choices as power attributes of households, but aggregated at the societal level (820). The system may also determine the aggregated price per consumption based on power attributes collectively of the households. Based on aggregated demand and aggregated price at the societal level, the system may determine the aggregated load, capacity and reserve available and required at the societal level. The algorithm engine 114 may use stochastic gradient learning techniques to develop a model of aggregation and the estimation engine 115 may use SSD to estimate aggregated demand conditions at the household level.

The system may further determine the aggregated demand on the list of consumption options as power attributes collectively of the households (810) and collectively of the societies (820), but at a macro level that includes multiple societies (830). The system may also determine the aggregated price per consumption based on power attributes of households 801 and collectively of societies. Based on aggregated demand and aggregated price at the macro-conditions, the system may determine the aggregated load, capacity and reserve available and required at macro-level conditions. The algorithm engine 114 may use stochastic gradient learning techniques to develop model of aggregation and the estimation engine 115 may use SSD to estimate aggregated demand conditions at the household level.

Figure 9:
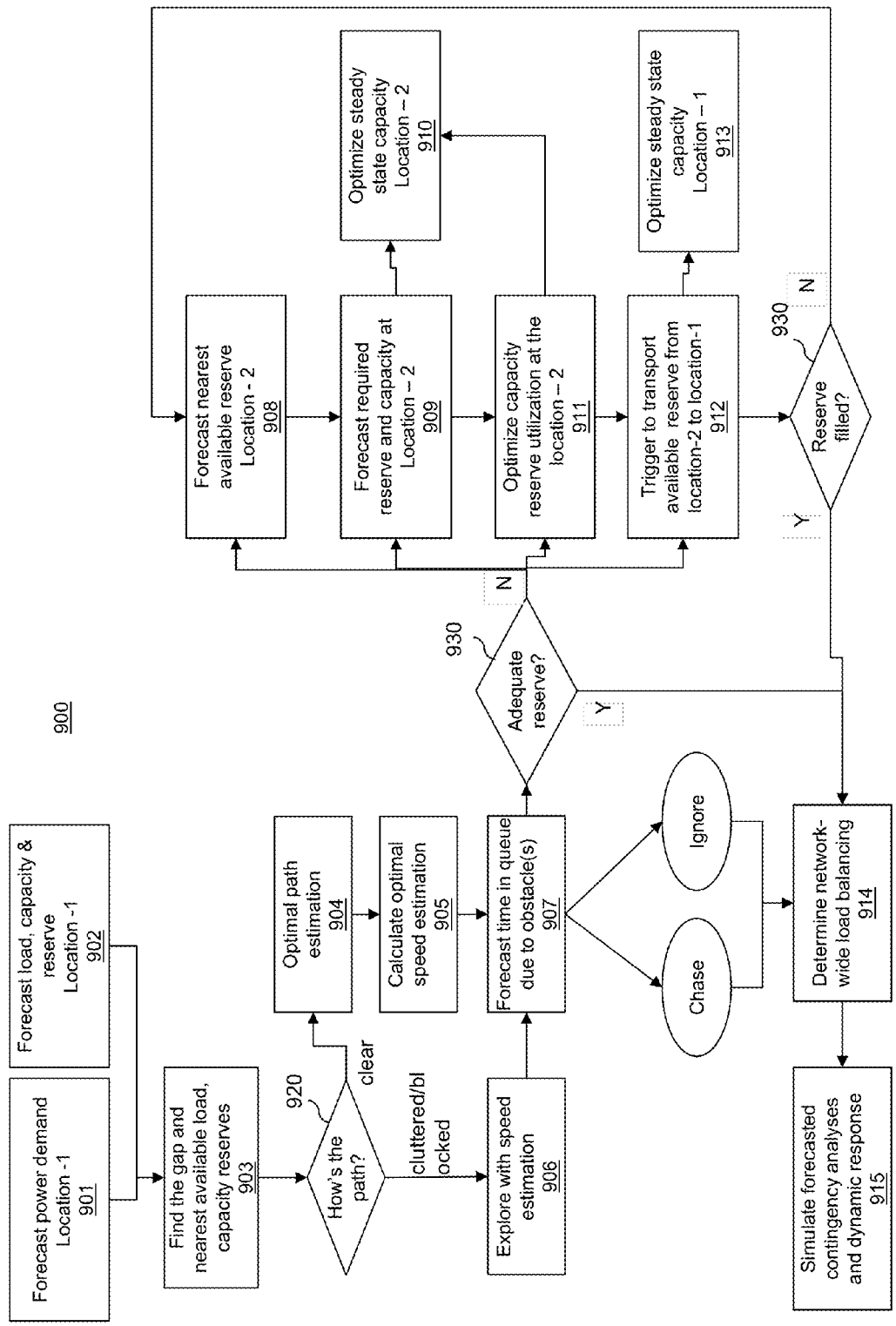
FIG. 9 is a flow chart of a method of actuation for location-based search-and-feed analysis to determine likely demand-capacity gap and availability of load and reserve power sources.

FIG. 9 is a flow chart of a method of actuation for location-based search-and-feed analysis to determine a likely demand-capacity gap and availability of load and reserve power sources at household and societal levels. The predictor 117 of system 100 may forecast location-based demand on a list of consumption options and on related power attributes at the household level (901). The predictor 117 may use HUP and SSP to forecast location-based demand. "Search-and-feed" may refer to the process by which the system 100 locates (or predicts) available sources of excess power supply with which to feed consumption devices (or groups thereof) that are predicted to have a power supply gap.

The predictor 117 may forecast location-based load, capacity and reserve availability, e.g., sources of power supply such as power distributors, generators, and/or collectors. The forecast may be based on a list of consumption options and on related power attributes at the household level (902). The predictor 117 may use CO, QSM and SSP to forecast location-based load, capacity and reserve capabilities.

The system may further determine a location-based gap between likely demand and available power supply from power supply sources (903). The system may use dynamically-generated data to determine the time and place the location-specific gap is likely to widen. The system may then shut down a consumption device and may also determine when and where the location-specific gap is likely to be minimized, e.g., when the power supply sources are greater than demand, which may be referred to herein as an excess of power supply. The predictor may use CO, MCNSE and SSP to determine the likely location-specific gap between demand and available load, capacity and reserve power sources.

The system may then analyze a path between a location of excess power supply and a location of a power gap (920). If the path appears clear, the system may estimate an optimal path between where the location-specific gap is widening and the location of the excess power supply (904). The actuator 116 may use OFT and PSEB to determine the optimal path.

Where, however, the system determines that the path is cluttered or completely blocked, which could be due to geographical or technological issues, the system may explore paths of the grid with a speed estimation, e.g., a speed to traverse reachable paths between a location of the power supply gap and a location of excess power supply. The exploration of the paths may be undertaken to avoid a certain path that includes an obstacle or to detect other location-based obstacles (e.g. weather condition in certain location) (906). The predictor 117 may use CO and SSP to forecast path conditions between locations.

The actuator 116 may work with results from the predictor 117 to estimate the speed at which action must be taken to meet a widening power supply gap so that the gap can be filled from the location of excess power supply (e.g., from load, capacity and reserve sources) (905). The actuator 116 may use SNF and FD methods to determine the speed at which the gap should be filled to avoid brownout or blackout conditions.

The system may further forecast the queue time of transferable power supply due to the obstacles in the path (907). The actuator 116 may use SNF and QT to determine the queue time at the obstacles to estimate the speed at which action should be taken to meet the speed at which the power gap should be filled to avoid brownout or blackout conditions. As an example, the actuator may determine whether there is an EV already getting charged at the EV/PHEV charge station or a device that is already active-in-use on electric charge as an "obstacle" (because the actuator cannot obtain the required data). The time during which the device is in use may be called a waiting period (or queue time) for the device to become free to obtain the data. The actuator may determine whether to continue to "chase" for obstacle-related information, e.g., wait until the device becomes free, or "ignore" the obstacle and pursue a different set of devices to source data. The system, as part of the path analysis in steps 920 and 904-907, may further determine a shift in the one or more paths required to avoid an obstacle on the determined one or more paths.

The system may then determine whether there is adequate reserve (or excess power supply) to meet the power supply gap (930). If adequate power reserve is located right away, the system may determine location-specific, but grid-wide, load balancing for stability of the power grid (914). The estimation engine 115 may use OPFC and NRM to optimize the location-specific as well as network load balancing and the actuator 116 may use BM and OFT for required actions.

The system may then further simulate forecasted contingencies and alternative scenarios with dynamically generated consumption data and likely responses at device, household and societal levels (915). The system may provide dynamic visualization of location-based activities with likely responses (e.g. the likely gap can also be fulfilled from another location with relatively higher price).

If there are not adequate reserves (or excess power supply) upon first analysis (930) the system may further determine the available reserve at a nearest location from the likely gap in power supply (908). The system may forecast the available reserve in that specific location to ensure the location has sufficient reserve available to meet predicted demand. The predictor 117 may use SSP to forecast location-specific available reserve.

The system may further determine the required reserve and capacity power levels at the nearest power supply source location from the likely gap in power supply (909). The system may forecast the required excess power supply in the specific location to ensure that the location has required reserve and capacity with surplus available reserve (908) to determine the location is at a steady state of power supply (910).

The system may then further determine an optimized level of reserve and capacity (excess) power supply at the nearest location from the likely gap in power supply (911). The system may optimize the required reserve and capacity in the specific location to ensure that the location has optimized the steady state (910). The estimation engine 115 may use OCE and OPFC to optimize required reserve and capacity with surplus available reserve power.

The system may further precipitate an action to transport available reserve (or excess) power from the location of excess power supply (e.g., location 2) to the location where the power supply gap is widening (e.g., location 1) (912). The actuator 116 may use OFT to identify the optimal path (904) with estimated queue time (907), and to initiate transport of the excess power from location 2 to location 1. The system may also optimize steady state power capacity conditions at location 1 after receipt of the excess power (913).

When the reserve at location 1 is filled (930), the system may proceed at step 914 as before, and determine location-specific, but network-wide, load balancing for stability of the power grid (914). The system may then further simulate forecasted contingencies and alternative (or similar) resolutions with dynamically generated consumption data and likely responses at device, household and societal levels (915).

Figure 10:
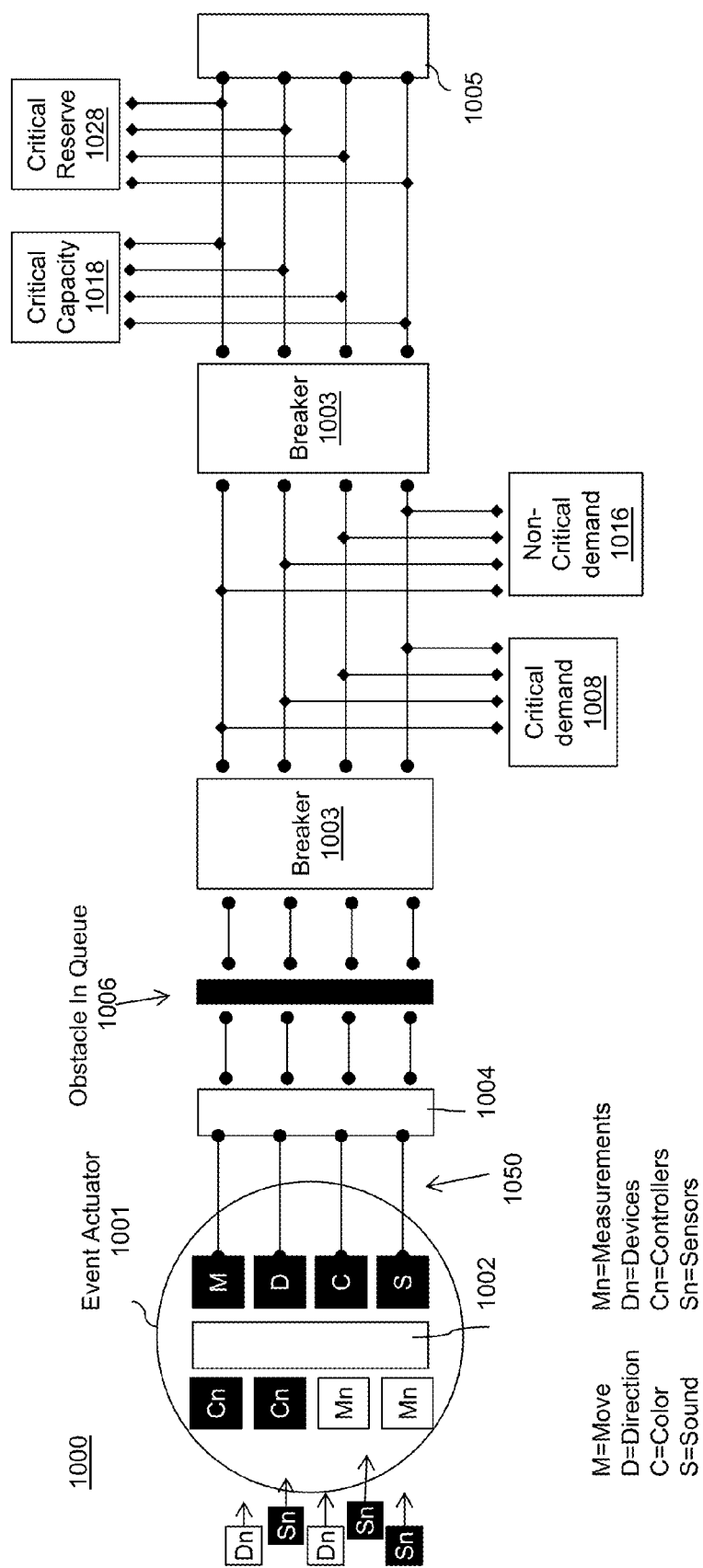
FIG. 10 is an abbreviated power grid diagram of control and data processing in relation to the search-and feed process of FIG. 9.

FIG. 10 is an abbreviated power grid diagram 1000 of control and data processing in relation to the search-and feed process of FIG. 9, particularly with reference to step 912. Various control and sensing components may interface with or be a part of the system 100, which may perform the search-and-feed process. The system 100, accordingly, may further include an event actuator 1001, which may be a processor and which may be operable to execute computation statistics 1002 on consumption and power supply data, and a step switcher 1004, which may interface with control lines (or busses) 1050 of the power grid. The event actuator 1001 may be a part of or executed by the actuator 116 of the system 100.

Figure 16:
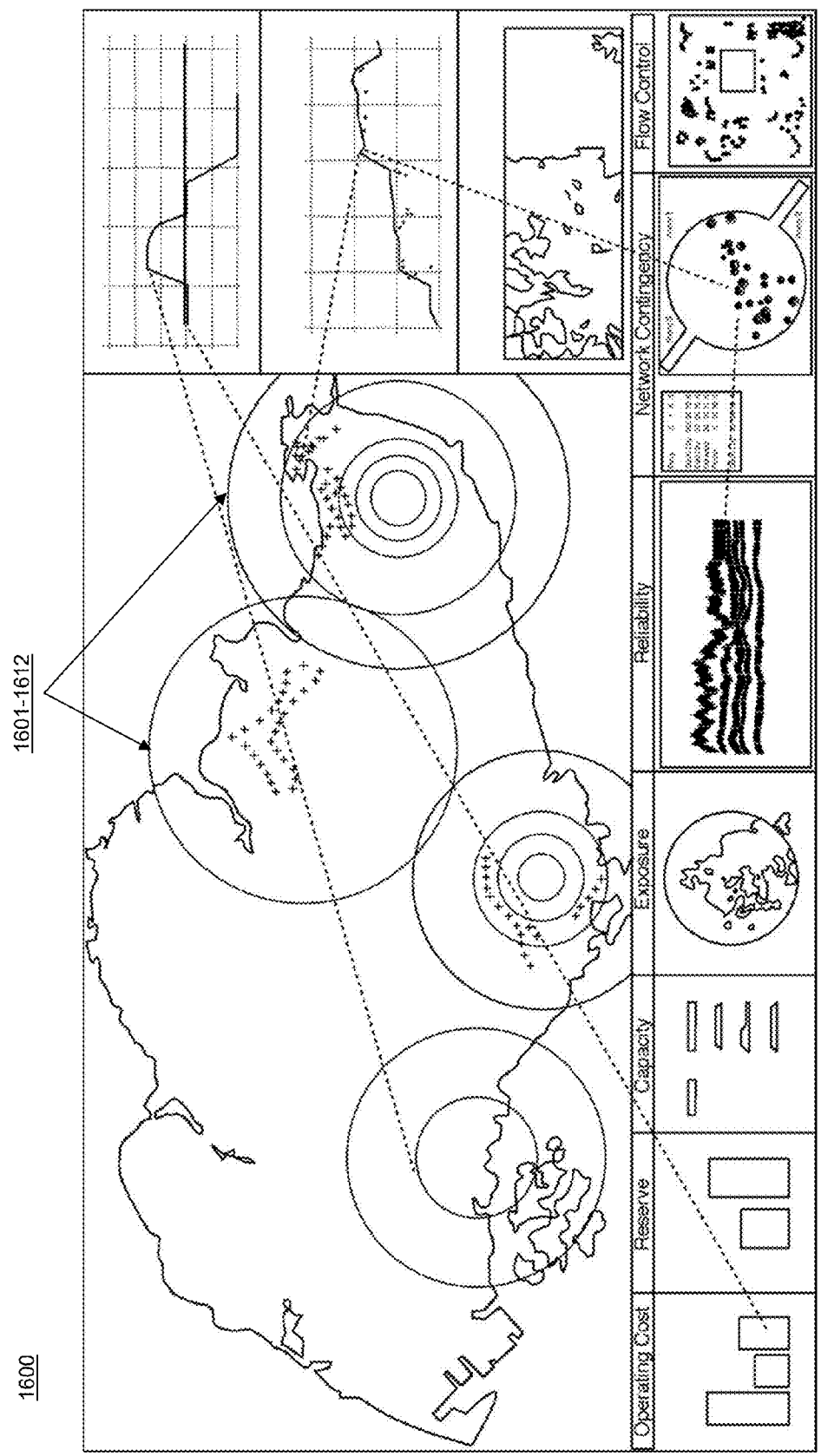
FIG. 16 is a screen shot of an example geographic-based power flow map with focus on data from locations of interest.
Figure 17:
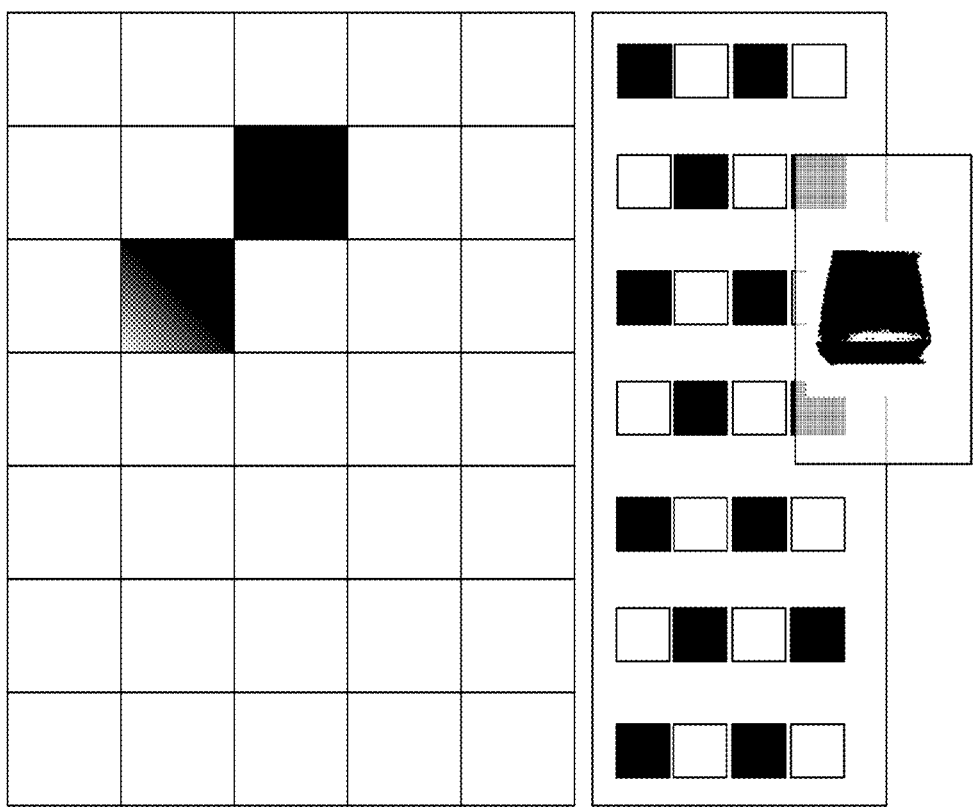
FIG. 17 is an example screen shot for the distributed information network as shown in FIG. 2, in which a device may annotate power data.

The control lines 1050 may represent movement (M), direction (D), color (C) and sound (S) and direct corresponding data in the system 100 to visually and/or orally provide an indication of the load balancing that is explained in FIG. 9. FIGS. 16 and 17 are example outputs of the data processing with respect to the diagram 1000. Input data to the system 100 may include measurements (Mn), devices (Dn), controllers (Cn) and sensors (Sn). A measurement may come from a meter or calibrator or like device. The devices (Dn) may be with reference to a consumption and access devices.

The power grid may include breakers 1003, obstacles 1006 in a queue, critical demand 1008 and non-critical demand 1016 sources of power consumption. The power grid may further include critical capacity 1018 and critical reserve 1028 sources of power supply. The power grid may also include end-point sensors 1005 at the end of power and control lines of the power grid.

The actuator controller 118 may initiate the event actuator 1001 to use one of the following four elements: move, direction, color and sound. The actuator controller 118 may then send commands to the event actuator 1001 for measuring ($m_n$) and controlling ($c_n$) to direct the movement, direction, color and sound of the event actuator (e.g., move 10 steps on the right on the map).

The actuator controller 118 may further switch steps dynamically in movement, direction, color and sound by directing the event actuator 1001 to send commands to the step switcher 1004 to switch steps between power lines. For example, if there is an obstacle and the actuator 116 is waiting in the queue, the actuator may be directed to switch steps, if necessary, to another direction, e.g., along a different power line.

The actuator controller 118 may further direct the breakers 1003 to break a trajectory of movement, direction, color and sound. The actuator controller 118 may send commands to the actuator 116 to break its trajectory at the breakers 1003. For example, the event actuator 1001 may abort measuring on a particular search or a particular consumption or generation device.

The system may further direct the actuator controller 118 to measure the criticality (e.g., of the demand) at a particular location including the critical activity of an access device 101. The actuator controller 118 may send commands to the event actuator 1001 to measure criticality (e.g. of the demand), determined by the estimation module 115, at a particular location including the critical activity.

The system may further direct the actuator controller 118 to perform an end-point action (e.g., switch-off a heater) at a particular location that includes the critical activity of an access device 101. The actuator controller 118 may send commands to the event actuator 1001 to perform end-point action (e.g., switch-off a heater), determined with the estimation engine 115, at a particular location including the critical activity.

Figure 11:
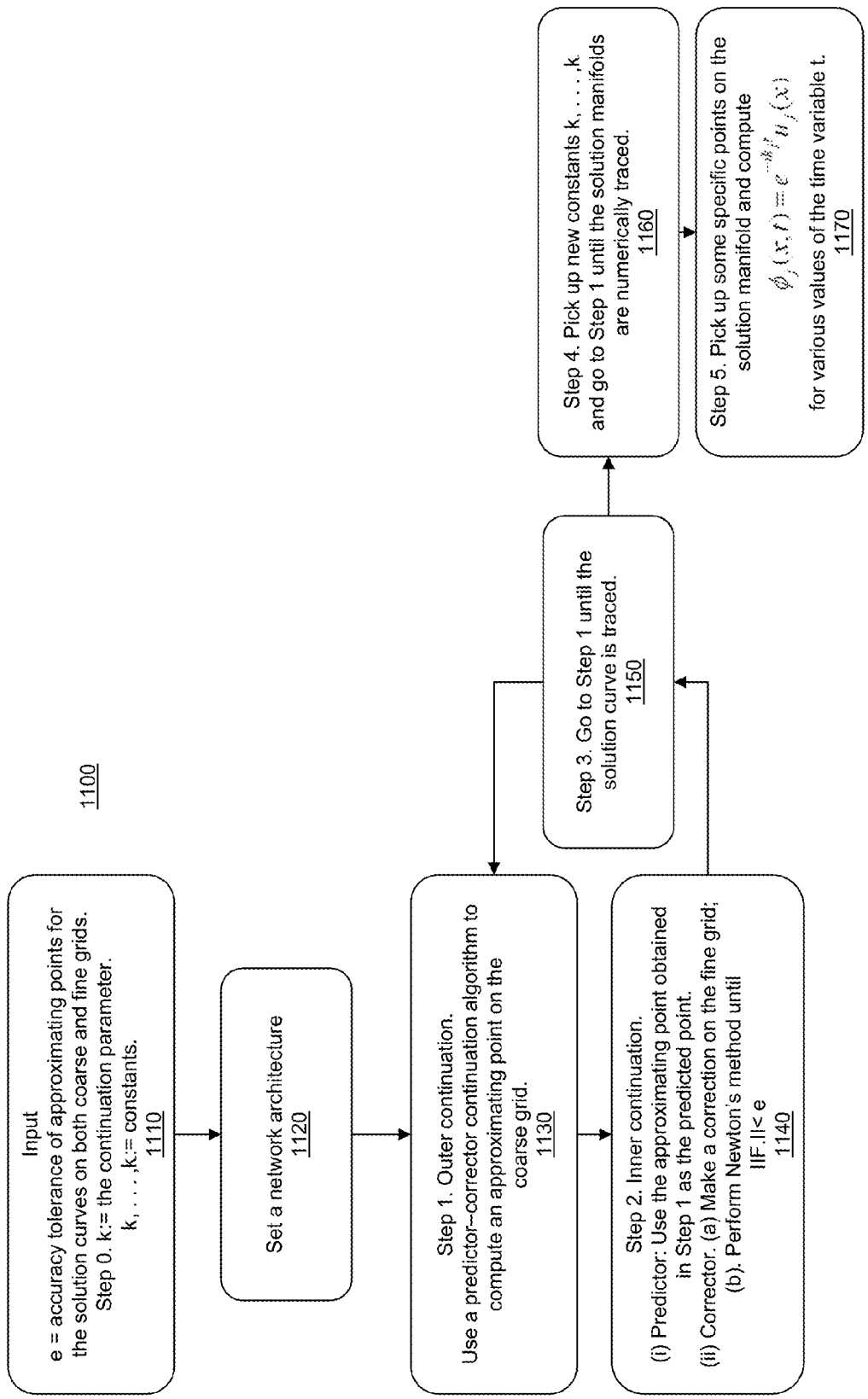
FIG. 11 is a flow chart of a method of predicting likely demand-capacity gap and available load, capacity, reserve for optimal power flow control.

FIG. 11 is a flow chart 1100 of a method of predicting likely demand-capacity gap and available load, capacity, reserve for optimal power flow control. The predictor 117 may initiate a forecast of location-specific likely gaps as covered in step 903 of the method of FIG. 3.

Furthermore, the predictor 117 may determine any stationary state solution that can be used as a starting point in the context of predictor-corrector continuation methods (111). To do so, the system may make a change of a variable in initial data accessible to the system 100. The predictor 117 may further determine the architecture of the network at device, household or societal level to forecast the location of the likely power gap (1120).

The system may further determine the outer continuation where the predictor 117 may use a predictor-corrector algorithm model of algorithm engine 114 to compute the approximate point of the location (1130). A quantum analogue to the optical experiments may be a Bose-Einstein condensate in a double-well potential where loss and gain are realized by removing activity of a device from one well and pumping in activity of devices in another well.

The system 100 may further determine the inner continuation where the predictor 117 may use the approximating point and corrector to make a correction on the fine grid network map, and continue to perform Newton-Raphson Method (NRM), until finding the location of the likely power gap (1140).

The system 100 may further determine the likely power gap curve where the predictor 117 may repeat step 1130 and step 1140, until the curve is traceable and visible to the actuator controller 118.

The system 100 may also determine the next constants (e.g., available location of load, capacity and reserve power sources) where the predictor 117 may repeat steps 1130, 1140 and 1150 for each constant until the curve is traceable and visible to the actuator controller 118.

The system 100 may also direct the predictor 117 to identify the specific point where only two real eigenvalues (e.g., demand and load) exist, where the fixed points can be identified as a center. Furthermore, the predictor 117 may determine that the fixed points in the region with four eigenvalues correspond to a center, a saddle point, a sink and a source. The center and saddle points collide at the branch point and vanish. The predictor 117 may make behavior visible to the actuator controller 118 in good agreement with the results of action.

A stability analysis of the wave functions shows that up to the bifurcation point, both the ground state and the excited state are stable, and correspond to the two centers. Beyond the bifurcation point, the excited state remains stable (a center) while the ground state becomes unstable (a saddle point). Out of the wave functions belonging to the two complex conjugate eigenvalues, one decays and the other grows, corresponding to the sink and the source, respectively.

The method of FIG. 11 may be particularly advantageous over traditional hierarchy model as this method and algorithm may be executed in parallel because the system 100 can trace each solution surface simultaneously. Using a numerical continuation method to trace solution surfaces of parameter-dependent problems was described with application to the power gap (901) and excess power supply (902) determined in the method of FIG. 9. It may be inexpensive to implement the algorithm because, in practical computations, the system 100 may function with the information of some specific points on the solution surfaces. Additionally, the proposed algorithm has the following non-exhaustive advantages: (i) it is unnecessary to discretize or integrate the subject data, namely, demand, load, capacity, reserve, and the like; and (ii) the system can compute this data for any time scale and for any points on the solution manifolds.

Figure 12:
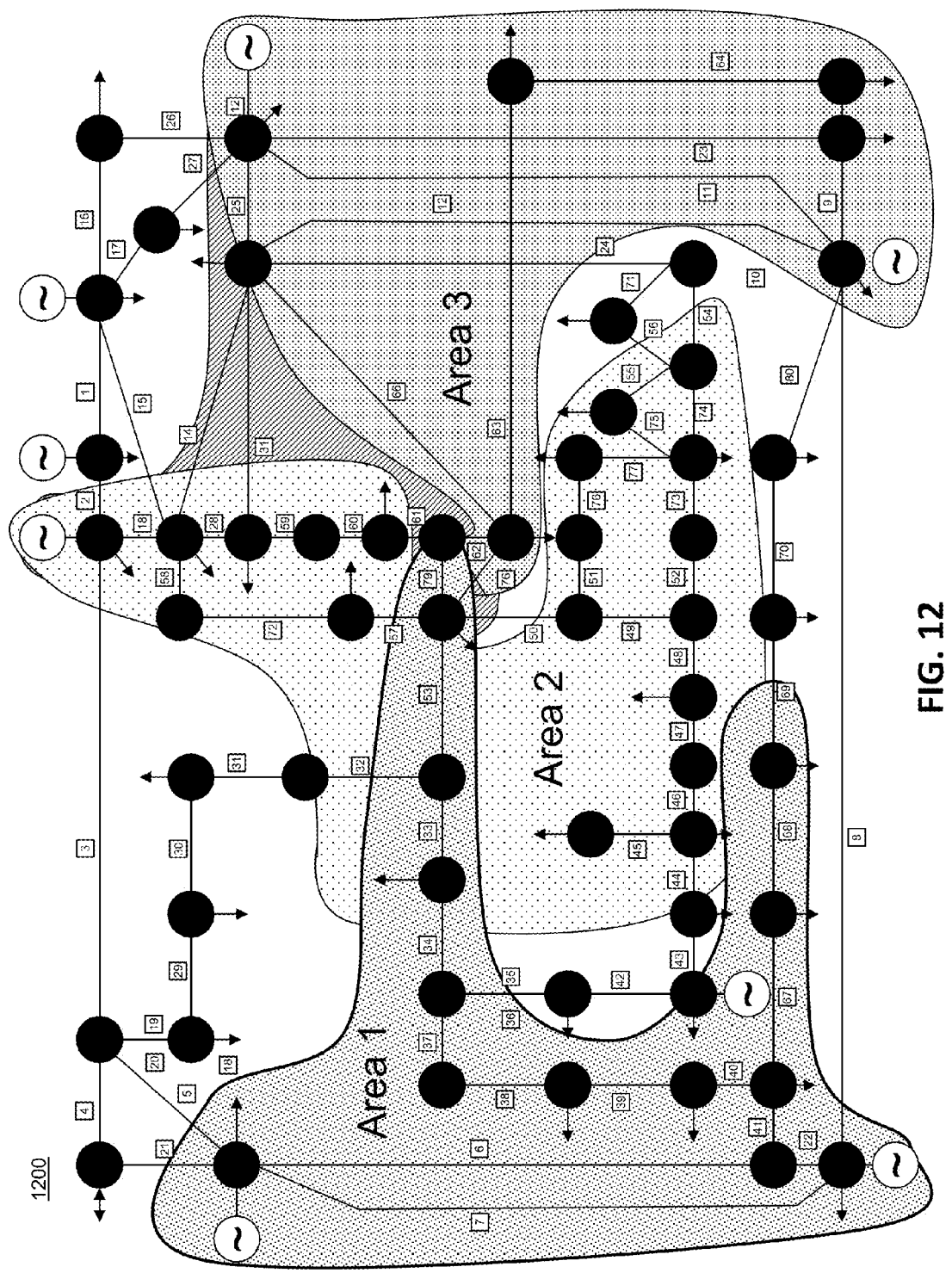
FIG. 12 is an abbreviated power grid diagram exhibiting power flow predictive analysis between sub-areas of a power grid.

FIG. 12 is an abbreviated power grid diagram 1200 exhibiting power flow predictive analysis between sub-areas of a power grid. The system 100 may be configured to perform optimal power flow control (914) as the final action when using the search-and-feed method as disclosed with reference to FIG. 9.

The predictor 117 may use decomposition of an optimization problem and perform a multi-area control method based on approximate Newton directions. In so dong, a single NRM step may be applied to each sub-problem that stabilizes the power grid. The applied decomposition method may be based on data obtained from neighboring agents. The data may be used to approximate the state of the system with a linearized model and make necessary changes in load and generator settings with the objective of reducing social costs of cascading failures. The method is advantageous over centralized optimal power flow taking the entire grid into account that is often not feasible. Reasons are the size of the resulting optimization problem but also the concurrent control of the system by several independent entities.

Figure 13:
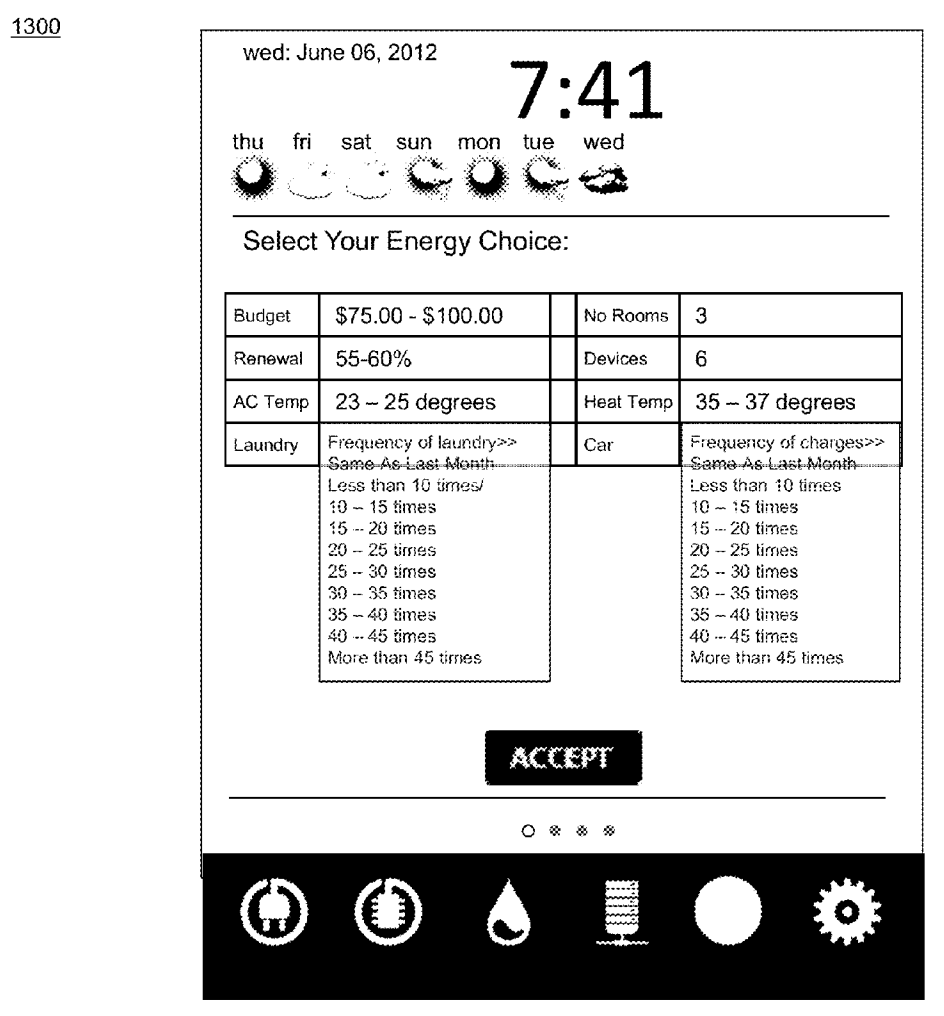

FIG. 13 is a screen shot 1300 of an example application executable by an access device 101 such as shown in FIG. 1. The screenshot 1300 illustrates the set up of user preferences with reference to a consumption device. The user may input these preferences, which may include, for example, a monthly budget, a percentage of renewal, a desired temperature (whether through air conditioning or heater), the number of rooms, consumption devices, a frequency of wash loads for laundry and a frequency of charges for an electric vehicle, and other such choices or preferences. These preferences may be provided to the system 100 for use in prediction as discussed. Furthermore, consumption and behavioral data from consumption devices 102 may also be sent to the system 100 through the access device 100, which data may be further forwarded to other consumption and access devices of a collaboration network 200.

Figure 14:
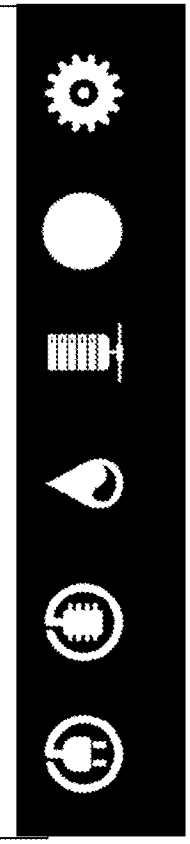
FIG. 14 is a screen shot of an example set of energy usage options as related to an identified access device that are selectable by a user.

FIG. 14 is a screen shot 1400 of an example set of energy usage options as related to an identified access device that are selectable by a user. The screenshot 1400 shows a list of energy usage (or power consumption) options of one or more consumption devices and based on a current location (e.g., in a house or a building). The list of power consumption options may be based on user settings and/or may be predicted from historical data. As described above, a location sensor in an access device 102 may detect the geographic location of the device 102 within the geographical footprint and the geographic location may be sent to the system 100.

The location of the access device 101 may be periodically transmitted at a predetermined frequency or time, or in response to a predetermined trigger event, to the consumption device 102. This periodic transmission of the access device may be especially useful if the consumption device is mobile such as an electrical vehicle. Such a trigger event may include detection of power consumption, an event or an activity of a consumption device.

Figure 15:
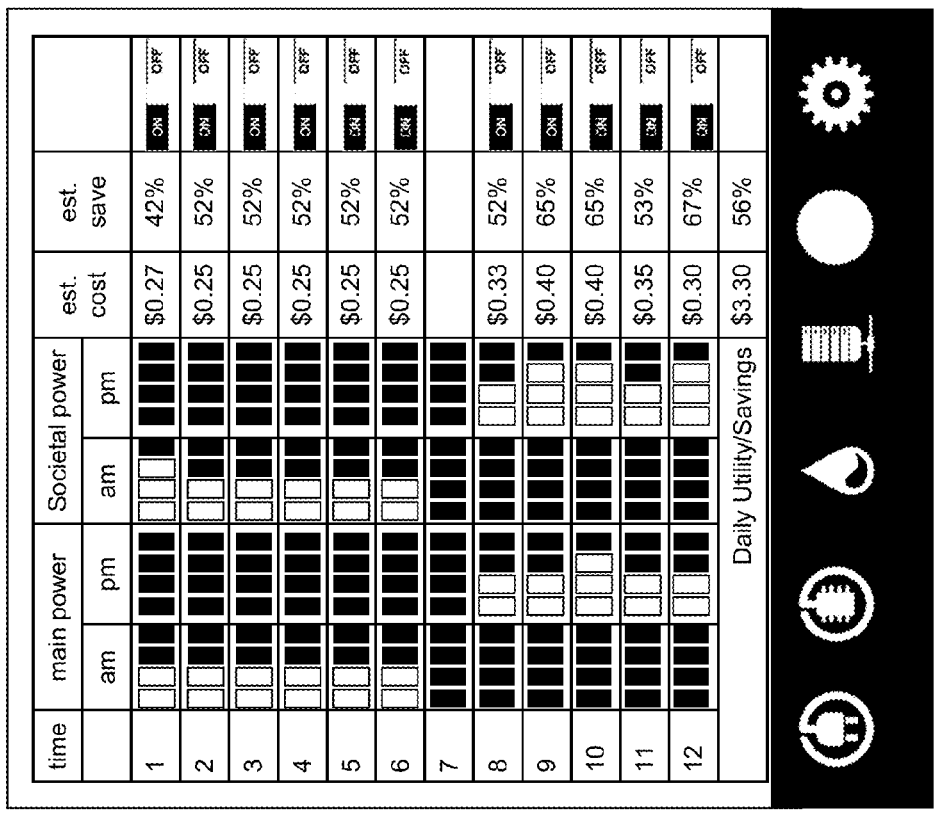
FIG. 15 is a screen shot of an example chart for tracking source of power consumption and associated savings due to use of societal power.

FIG. 15 is a screen shot 1500 of an example chart for tracking source of power consumption and associated savings due to use of societal power. The screen shot 1500 may be generated by an application executed by an access device 101. The screenshot 1500 shows location-based power services provided by the system 100. The access device 101 may be configured such that the application may recognize when power is used and, in response to such power usage, instruct the consumption device 102 on activities and time of use. For example, activity on device data may be provided to the system 100 for storage and/or for providing societal-scale energy preference to the consumption device. A historic log of detected geographic locations of the access device may be updated.

The system 100 may further associate energy with location data and other information. For example, data may be created using an access device 101, the power consumption device 102 and other devices 103. The data generated may also include the geographic location of the access device 101, the power consumption device 102 and other devices 103 at the time that the data created is used to create a "geo-tag" that is associated with the data.

In this or similar manner, location-based content services may associate other information with data, including, but not limited to, timestamps (e.g., the time and/or date when the data was created), device identifiers (e.g., an identifier for a consumption device associated with the access device and/or who created the data), and data descriptions or type identifiers (e.g., a photograph metadata-type identifier). This other information, once associated with the data, may be referred to as "other tag" data. Geo-tag data and/or other tag data associated with data may be utilized for selective retrieval and distribution.

The location-based content services may provide a power consumption device for an access device with a capability of creating and publishing data at a specific location within a network footprint. As an example, a consumption device may be physically located at a particular geographic location. The consumption device may utilize the access device to create data or to search for data, such as searching for nearest restaurant. Data (e.g., time of heating) is already stored in the data storage of the system 100. Location-based target content services may recognize a content creation event and instruct the location-based services to detect the geographic location of the access device. The location services may detect the geographic location and provide location data, e.g., geo-tag data, representing the detected geographic location of the access device. Location based target content services may associate the location data with the consumption data and provide the data, associated geo-tag data, and optionally other associated tag data to the system.

FIG. 16 is a screen shot 1600 of an example geographic-based power flow map with focus on data from locations of interest. The screen shot 1600 may be indicative of location content representation between data records associated with a consumption device. The decision-making content data may include target content and activity data, and geo-tag data may include target geo-tags. Data attributes may represent data respectively associated with target geographic locations. For example, location data may correspond to locations referenced in steps 901 to 912 of FIG. 9. The location content data 1601 through 1612 may be provided based on proximity to target locations corresponding to steps 901 to 912 of FIG. 9. Content services may be configured to utilize data included in the content representation 1601 to search for and identify matching geo-tag data. The arrows illustrated in FIG. 16 represent identified matches between a detected location and a geo-tag.

Data may be provided for the consumption device to receive and annotate the data in some instances. For example, an access device may receive a notification of identified data having been made accessible to the access device based on a detected target location of the data. The consumption device may choose to receive the identified target location data. In addition, the consumption device may make one or more annotations to the identified data for an activity. Annotations may be stored in conjunction with the data as can be metadata in computer applications.

The consumption device may further provide consumption or sensor data for a specific activity (e.g., "heating water with water-heater"), review the data (e.g., extent of hot water in water heater), edit the data, block the data from being made accessible to the access device and/or to another consumption device, and report the data (e.g., temperature on thermostat). The access device may provide the data and annotation to the system 100. Any annotation may be added to other tag data associated with the identified data. Accordingly, annotations may be used to index, search, and retrieve identified data for an activity. For example, a consumption device may search accessible data for specifically identified data having a particular rating, associated with a particular creator, created during a particular time range, having associated comments, and the like.

The system 100 may be further configured to enable consumption, generation and access devices to initiate a grid network governing process with one another in connection with a target geographic location. For example, at a location for a particular data, a device may establish and participate in follow-up communications with one another. Such follow-up communications may be hosted and made accessible to the involved device, and in some instances, such communications are made accessible exclusively to the involved devices.

FIG. 17 is an example screen shot 1700 for the distributed information network 200 as shown in FIG. 2, in which a device may annotate power data. A consumption device may utilize the access device to post data and receive data based on target locations. FIG. 17 shows that a consumption device may receive data and annotate the data. In an example, the location of the consumption device and locations between consumption (and/or access) devices and the detected location may qualify the consumption device for access to data. A consumption device may elect to utilize additional access devices (e.g., mobile access devices) to retrieve and experience data. Accordingly, a consumption device may access additional access identified data, a communication display, a communication thread and sensor communications to retrieve, review, and annotate data that has been made accessible.

Figure 18:
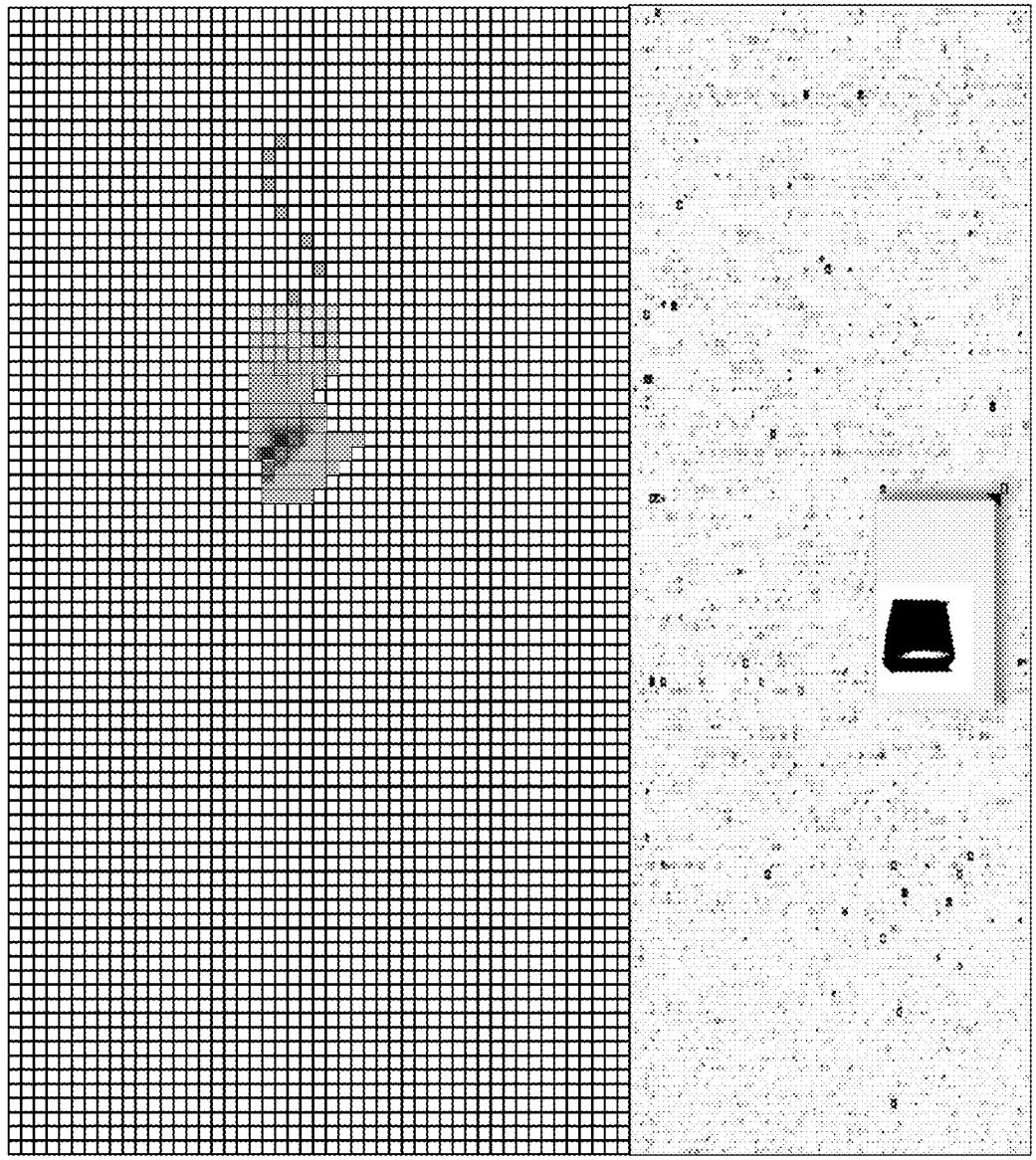
FIG. 18 is a screen shot of an exemplary portion of a location in a power grid, to illustrate optimal flow control mechanism to meet a power gap between demand-capacity forecasts.

FIG. 18 is a screen shot 1800 of an exemplary portion of a location in a power grid, to illustrate an optimal flow control mechanism as described in FIGS. 9, 10, 11 and 12. The optimal flow control mechanism as preciously describe may be adapted to meet a power gap between demand-capacity and reserve forecasts. The system may use dynamic information to resolve and execute location-based search-and-feed (SNF) and OFT methods. Dynamic information takes into consideration direction and speed to identify the location at which to generate power to fill a likely power gap at a location in a power grid. The actuator of one or more systems 100 may perform the gap distribution analysis at various locations to determine a distance between a consumption device and a second consumption device as the consumption device moves toward a destination, e.g., a location of the second device.

For example, the actuator 116 of an EV/PHEV charge station (the consumption device) may find that consumption is increasing at a particular speed. The actuator 116 may also determine that the likely power gap between demand and available supply is widening at another speed in another EV/PHEV charge station (the second consumption device), and so the gap between these two may be considered the speed gap.

In one example, energy authorities or service providers may use the speed gap to determine location, speed and direction of a consumption device. The service provider may then fill the demand for power by the reserve and capacity power sources. The service provider may also balance the load locally as well as at societal levels using optimal power flow control. Satisfaction of a power gap in this way may be an indication of reaching a steady state, which may be used to aggregate power to a household as well as at a societal level to determine stability.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A method comprising:
orchestrating peer-to-peer communication between power consumption devices over a communication network, each of the power consumption devices being associated with an access device operable to provide communication with other of the power consumption devices;
monitoring, using a processor of a computing device included in the access device associated with a respective power consumption device, for new event data from the respective power consumption device, the new event data including information selected from the group consisting of: a respective power consumption device location, operating information of the respective power consumption device, and sensor data obtained by a sensor from the respective power consumption device;
analyzing, using the processor, the new event data to determine power consumption behavior of the respective power consumption device;
anticipating, using the processor, an occurrence of a future event responsive to the analysis of the received new event data in relation to the determined power consumption behavior of the respective power consumption device;
predicting, using the processor, the outcome of the future event based on analysis of the received new event data in relation to past behavior data of the respective power consumption device; and
communicating, by the computing device, the anticipated future event and the predicted outcome to one or more other power consumption devices the one or more other power consumption devices responsive to the future event based on the device location of the respective one of the power consumption devices in relation to the one or more other power consumption devices, and a timing of the predicted outcome.

2. The method of claim 1, where anticipating further comprises:
extracting a pattern of power consumption during periods of a day or week from the new event data; and
comparing the pattern with identified patterns stored in relation to events in a database stored in memory.

3. The method of claim 1, further comprising:
limiting the communication of the anticipated future event and predicted outcome to only those of the one or more power consumption devices within a defined geographic area.

4. The method of claim 1, where the future event comprises a surge in power.

5. The method of claim 1, where the future event comprises a determined consumption of power during a determined period of time, further comprising:
aggregating anticipated events and predicted outcomes from multiple power consumption devices over the determined period of time; and
predicting a surge in power at a geographic location at a future moment in time responsive to the aggregated anticipated events and predicted outcomes.

6. The method of claim 1, where the future event comprises failure of the respective power consumption device.

7. The method of claim 1, where the analyzing, estimating and predicting occur on a continuous basis.

8. A system comprising:
a processor included in an access device associated with a respective power consumption device;
a network interface executable by the processor to monitor for new event data from other power consumption devices over a network, the new event data including information selected from the group consisting of: a device location of the other power consumption devices, operating information of the other power consumption devices, and sensor data from the other power consumption devices;
an estimation engine executable by the processor to analyze the new event data to determine power consumption behavior of the respective power consumption device; and
a predictor executable by the processor to anticipate an occurrence of a future event responsive to the analysis, and to predict the outcome of the future event based on analysis of the new event data in relation to past behavior data of the respective power consumption device;
where the network interface is further operable to communicate the anticipated future event and the predicted outcome to one or more of the other power consumption devices, the one or more other power consumption devices responsive to the anticipated future event in accordance with a proximate location of the respective power consumption device and a timing of the predicted outcome.

9. The system of claim 8, further comprising multiple access devices in communication with the one or more other power consumption devices, where the network interface is further operable to receive the new event data from the access device, and where the access device is configured to provide communication between the respective power consumption device and the one or more other consumption devices via at least one of the multiple access devices.

10. The system of claim 8, where the predictor is further operable to:
extract a pattern of power consumption during periods of a day or week from the new event data; and compare the pattern with identified patterns stored in relation to events in a database stored in memory.

11. The system of claim 8, where the network interface is limited by the processor to monitor for new event data in a predefined geographic area in which the other power consumption devices to which the network interface communicates the anticipated future event and the predict outcome.

12. The system of claim 8, where the future event comprises a surge in power.

13. The system of claim 8, where the future event comprises a determined consumption of power during a determined period of time.

14. The system of claim 13, where the predictor is further operable to:
aggregate anticipated events and predicted outcomes from multiple power consumption devices over the determined period of time; and
predict a common future event for a group of consumption devices that share a common geographic area.

15. The system of claim 8, where the future event comprises failure of the respective power consumption device.

16. The system of claim 8, where the estimation engine and the predictor are operable to analyze the new event data at a continuous rate.

17. The system of claim 8, further comprising:
an actuator executable by the processor to execute an actuation method comprising taking an action with relation to a power flow to or from the respective power consumption device; and confirming the future event through two-way data communication with the respective power consumption device.

18. The method of claim 1, wherein communicating the anticipated future event and the predicted outcome comprises communicating the anticipated future event and the predicted outcome to the one or more of the other power consumption devices in a predetermined geographic proximity to the respective one of the power consumption devices.

19. The system of claim 8, wherein the anticipated future event and the predicted outcome is communicated to one or more of the other power consumption devices to control, using the processor, consumption choices for the one or more of the other power consumption devices.

20. A system comprising:
a first power consumption device;
a first access device associated with the first power consumption device and configured to monitor for new event data from the first power consumption device, the new event data comprising a geographic location and an operation of the first power consumption device;
the first access device further configured to anticipate occurrence of a future event and predict an outcome of the predicted future event for the first power consumption device based on the new event data, which includes the geographic location, and transmit the anticipated future event and the predicted outcome to a second power consumption device via a second access device, the second power consumption device being within a predetermined proximity of the geographic location;
the second power consumption device associated with a second access device configured to adjust operation of the second power consumption device in response to receipt of the anticipated occurrence of the future event, an estimated time until the predicted outcome and the geographic location of the first power consumption device.

21. The system of claim 20, wherein the new event data is published for access by the second access device as location-based device consumption data, and the second power consumption device is configured to respond to corresponding controls provided by the second access device that are responsive to the location-based device consumption data.

22. The system of claim 20, wherein the first power consumption device and the second power consumption device work in concert with the respective first access device and the second access device to create and receive consumption data.

23. The system of claim 20, wherein the first access device and the second access device each include a meter.

24. The system of claim 20, wherein the first access device and the second access device each include a sensor.

25. The system of claim 20, wherein the new event data comprises a current time, and the estimated time until the predicted outcome is determined based on the current time.

* * * * *

UNITED STATES PATENT AND TRADEMARK OFFICE
CERTIFICATE OF CORRECTION

PATENT NO. : 9,620,959 B2
APPLICATION NO. : 13/834388
DATED : April 11, 2017
INVENTOR(S) : Prabir Sen and Trent A. Mayberry It is certified that error appears in the above-identified patent and that said Letters Patent is hereby corrected as shown below:

In the Specification

In Column 17, Lines 44 to 60, replace the paragraph and equation with the following:
For example, an information flow for a device aggregated to another device using the sheaf method of transmitted data $z = (zs_1 ; ...; zs_\alpha); zs_i \in k^n_{si} ; s_i \in S;$ may be defined by an assignment $\Psi(e) \in k^{cap(e)}$ for each edge $e \in \mathcal{E}$ satisfying the flow conditions. The flow conditions may include the data that are related by local coding maps $\Phi_v$ at all vertices v. More specifically, for $e = |vw|$ and $e_i \in In(v; \mathcal{E})$ $(i = 1;...;K);$ , which may be expressed as:

$$X_{v:Y' \to Y} A(Y') \xrightarrow[\eta]{\zeta} X_{(Y,p)} A(Y) \xrightarrow{\lambda} P \otimes yA$$

Where $P \otimes yA$ = local information flow probability aggregated in a set y or $L_A(P)$.

Signed and Sealed this
Fifteenth Day of May, 2018

Andrei Iancu
*Director of the United States Patent and Trademark Office*